(12) United States Patent
Morita et al.

(10) Patent No.: US 10,020,774 B2
(45) Date of Patent: Jul. 10, 2018

(54) SELF-PROPELLED CLEANING ROBOT

(71) Applicant: MIRAIKIKAI, INC., Kurashiki-shi, Okayama (JP)

(72) Inventors: Kazuo Morita, Takamatsu (JP); Tohru Miyake, Takamatsu (JP)

(73) Assignee: MIRAIKIKAI, INC., Kurashiki-shi, Okayama (JP)

( * ) Notice: Subject to any disclaimer, the term of this patent is extended or adjusted under 35 U.S.C. 154(b) by 640 days.

(21) Appl. No.: 14/430,717

(22) PCT Filed: Dec. 25, 2013

(86) PCT No.: PCT/JP2013/007561
§ 371 (c)(1),
(2) Date: Mar. 24, 2015

(87) PCT Pub. No.: WO2014/103291
PCT Pub. Date: Jul. 3, 2014

(65) Prior Publication Data
US 2015/0229265 A1 Aug. 13, 2015

(30) Foreign Application Priority Data
Dec. 25, 2012 (JP) .................................. 2012-281531

(51) Int. Cl.
*A47L 11/24* (2006.01)
*H02S 40/10* (2014.01)
(Continued)

(52) U.S. Cl.
CPC .............. *H02S 40/10* (2014.12); *A47L 11/24* (2013.01); *A47L 11/4072* (2013.01);
(Continued)

(58) Field of Classification Search
CPC ...... B08B 1/006; H02S 40/10; A47L 11/4072; A47L 11/24
See application file for complete search history.

(56) References Cited

U.S. PATENT DOCUMENTS 9,480,379 B2* 11/2016 Yoon ....................... A47L 11/33

FOREIGN PATENT DOCUMENTS

| JP | S57-87562 A | 6/1982 |
| JP | 2004-166968 A | 6/2004 |

(Continued)

OTHER PUBLICATIONS

International Search Report of PCT/JP2013/007561 filed on Dec. 25, 2013.

(Continued)

*Primary Examiner* — Michael Jennings
(74) *Attorney, Agent, or Firm* — Muncy, Geissler, Olds & Lowe, P.C.

(57) ABSTRACT

Provided is a self-propelled cleaning robot that can efficiently perform cleaning even on a flat surface having a gap or a step. A self-propelled cleaning robot (1) that self-travels on and cleans a flat surface (SF) of a structure, a groove (G) being formed in the flat surface (SF), the self-propelled cleaning robot (1) includes a robot main body (2) in which a self-propelled moving means (4) is provided and a guidance unit (40) that guides movement of the robot main body (2). At this point, the guidance unit (40) includes: a shaft member (43) that is provided so as to be detachably inserted in the groove (G) and a shaft member moving mechanism (45) that controls insertion and removal of the shaft member (43) with respect to the groove (G). The robot main body (2) is provided so as to be turnable about the shaft member (43) in a state in which the shaft member (43) of the guidance unit (40) is inserted in the groove.

9 Claims, 15 Drawing Sheets

(51) Int. Cl.
*B08B 1/04* (2006.01)
*A47L 11/40* (2006.01)
*F24J 2/46* (2006.01)
*E04G 23/00* (2006.01)
*G05D 1/00* (2006.01)
*B08B 1/00* (2006.01)
*B08B 5/04* (2006.01)

(52) U.S. Cl.
CPC ............... *B08B 1/006* (2013.01); *B08B 1/04* (2013.01); *E04G 23/002* (2013.01); *F24J 2/461* (2013.01); *G05D 1/0088* (2013.01); *A47L 2201/00* (2013.01); *B08B 1/002* (2013.01); *B08B 5/04* (2013.01); *Y02E 10/40* (2013.01)

(56) References Cited

FOREIGN PATENT DOCUMENTS

| | | |
|---|---|---|
| JP | 2004166968 A | 6/2004 |
| KR | 2010-0091056 A | 8/2010 |

OTHER PUBLICATIONS

The extended European search report for the corresponding application No. EP13867860.

\* cited by examiner

Fig. 8
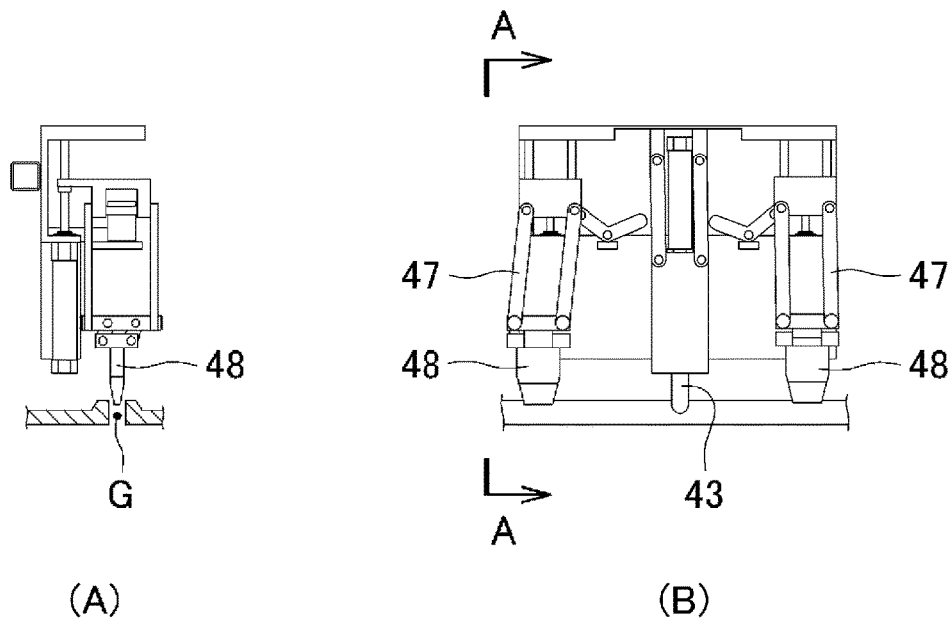
(A)　　　　　　　　　　(B)
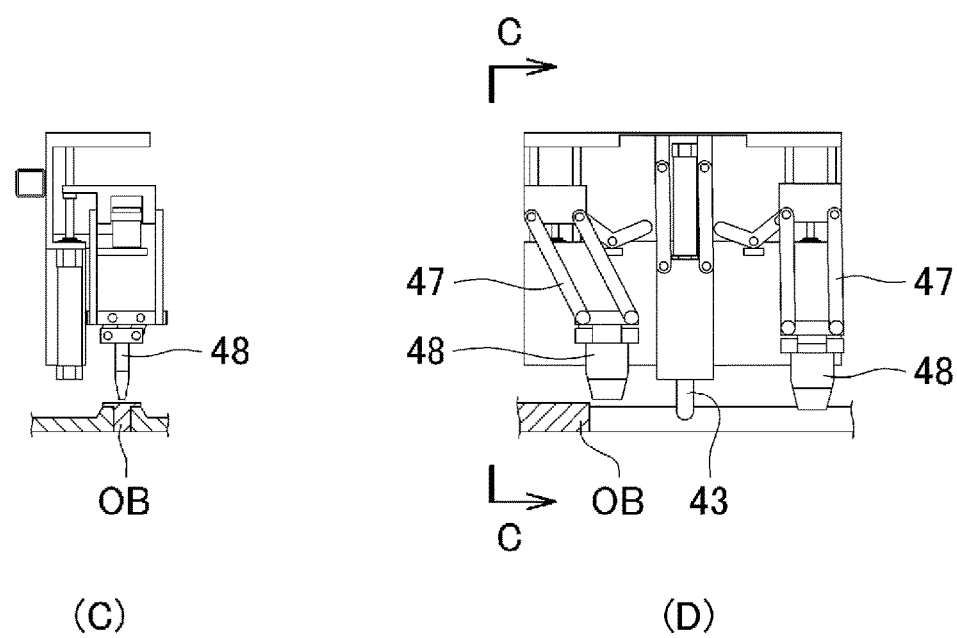
(C)　　　　　　　　　　(D)

Fig. 9
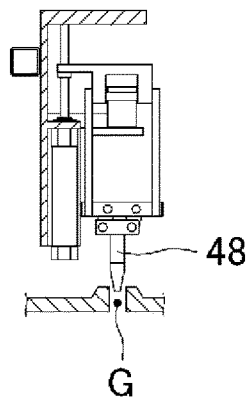
(E)
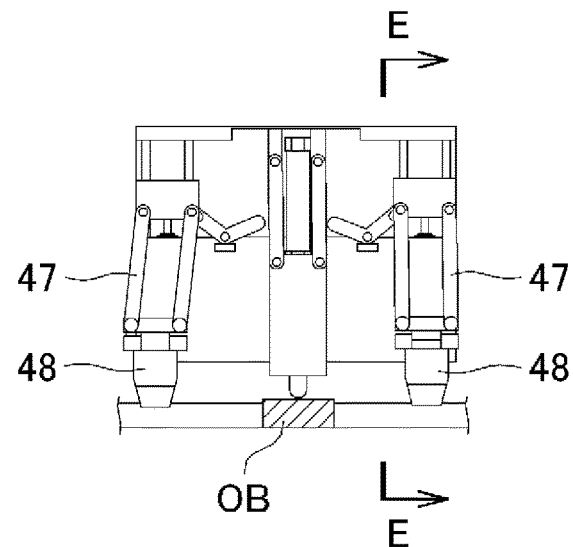
(F)
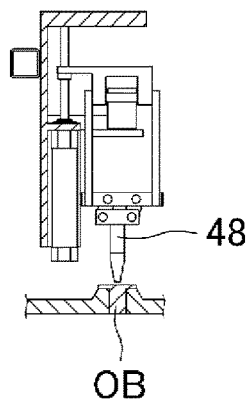
(G)
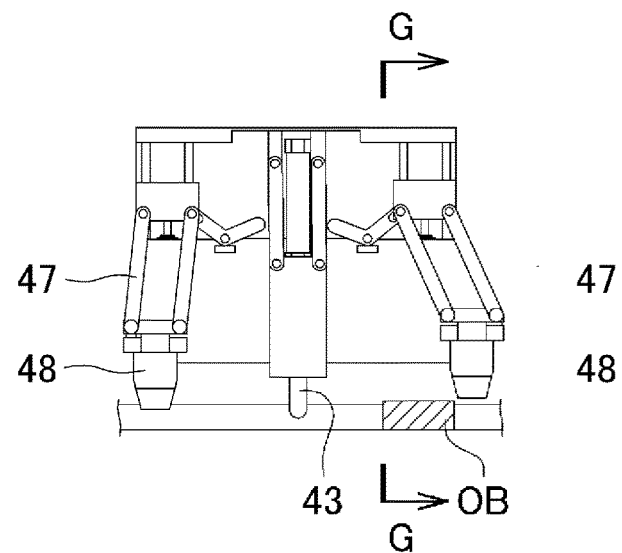
(H)

Fig. 12
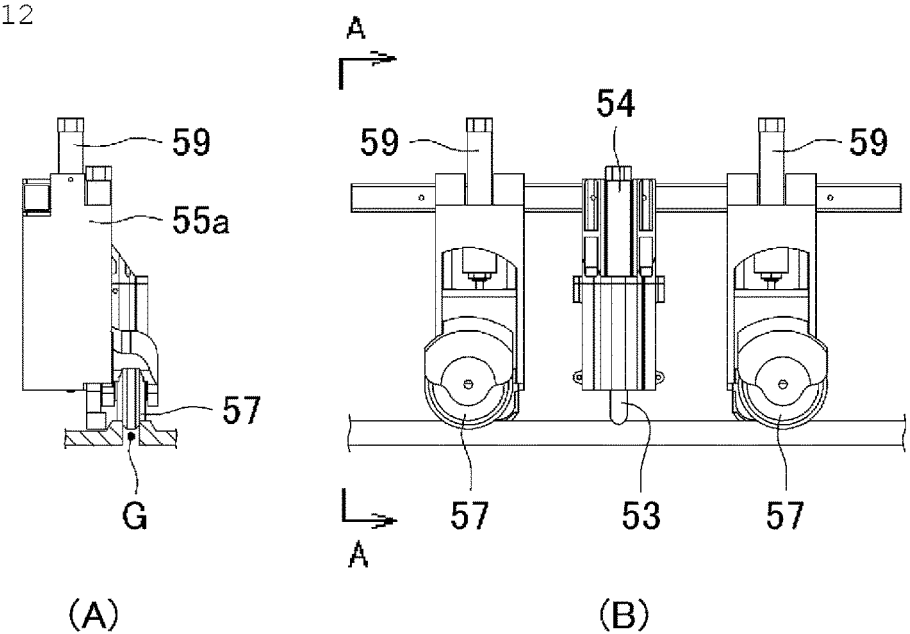
(A)  (B)
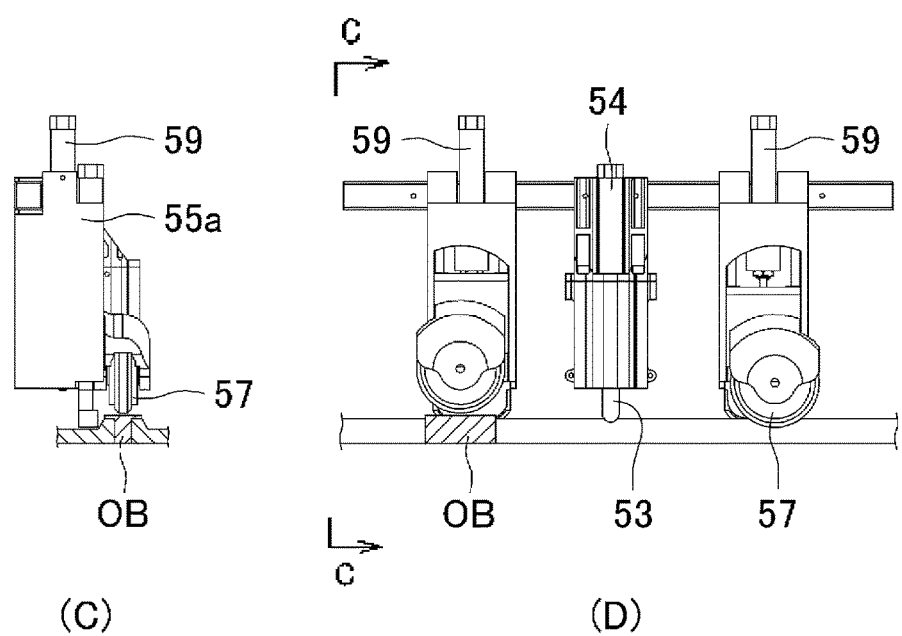
(C)  (D)

Fig. 13
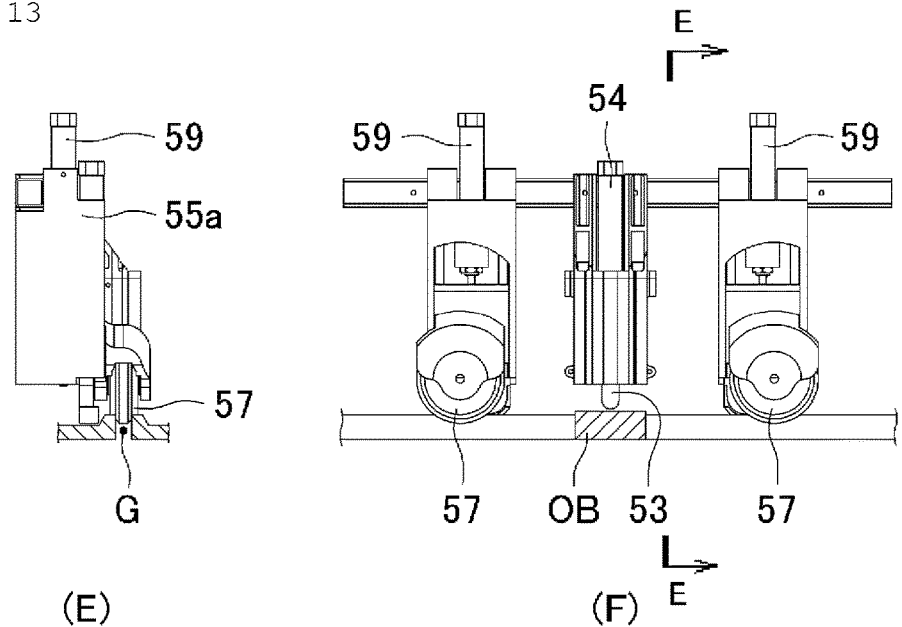
(E)  (F)
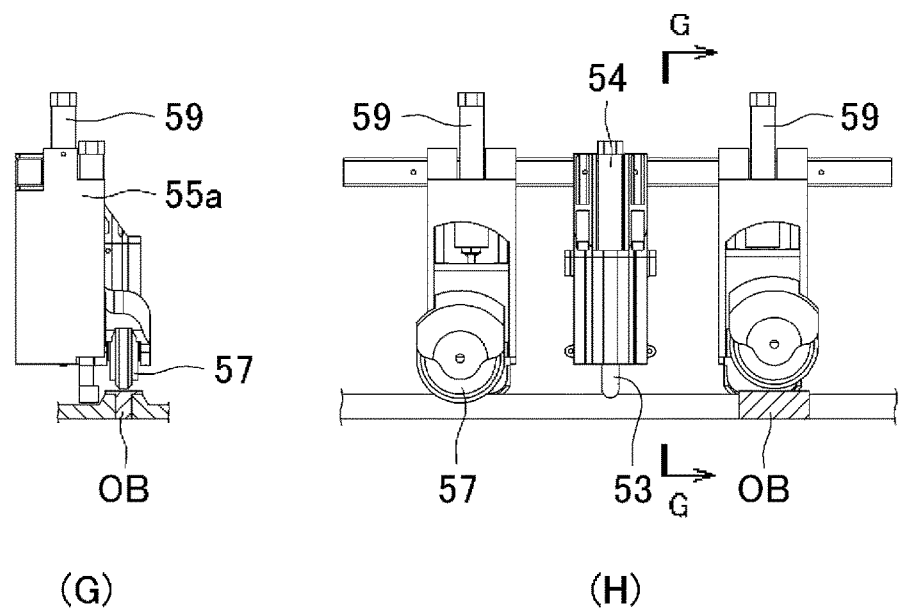
(G)  (H)

Fig. 14
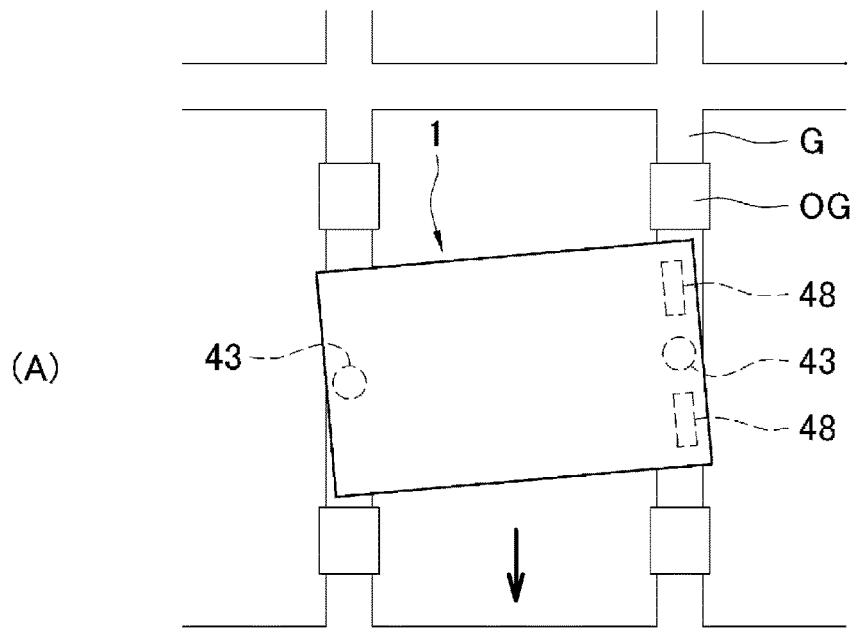
(A)
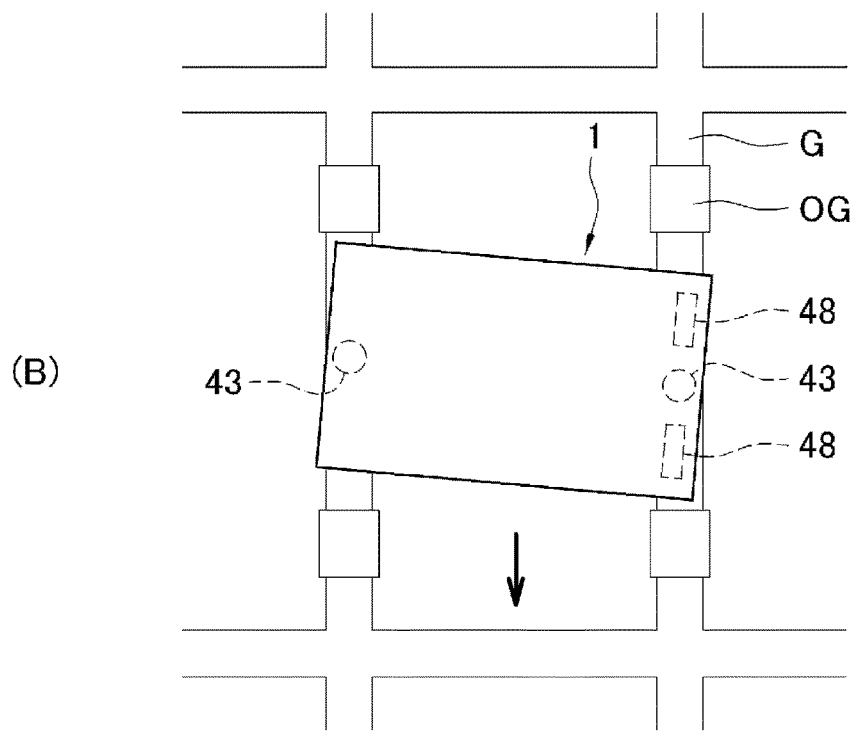
(B)

Fig. 15
(A) 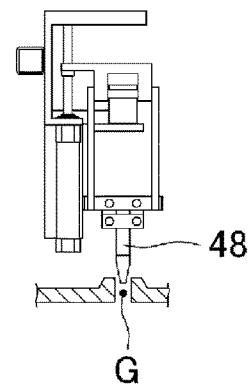
(B) 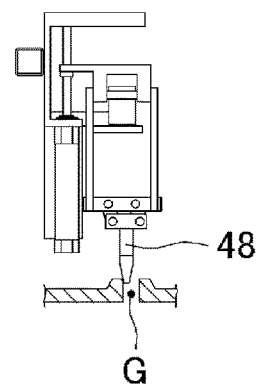
(C) 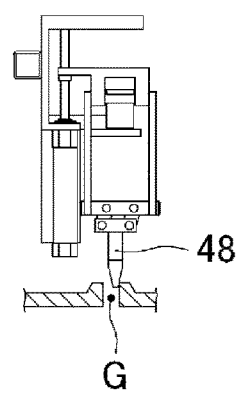

SELF-PROPELLED CLEANING ROBOT

CROSS REFERENCE TO RELATED APPLICATIONS

This application is a national stage of International Application No.: PCT/JP2013/007561, which was filed on Dec. 25, 2013, and which claims priority to JP 2012-281531 which was filed on Dec. 25, 2012, and which are both herein incorporated by reference.

The present invention relates to a self-propelled cleaning robot. More particularly, the present invention relates to a self-propelled cleaning robot that cleans a surface of a solar cell array used in solar power generation and a surface of a condensing mirror used in solar thermal power generation.

BACKGROUND ART

Nowadays, a demand for power generation using renewable energy increases, and particularly solar power generation or solar thermal power generation using sunlight attracts attention.

For example, a solar power generation facility ranges from a facility having a power generation capacity of about 3 kilowatts to about 4 kilowatts provided in a standard home to a commercial large-scale power generation facility having a power generation capacity exceeding 1 megawatt, and is expected as an alternative power generation facility for thermal power generation or nuclear power generation. Even in the solar thermal power generation facility, there are many large-scale facilities having the power generation capacity exceeding 1 megawatt, and the solar thermal power generation facility is also expected as the alternative power generation facility for thermal power generation or nuclear power generation.

The power is generated by receiving solar radiation light from the sun in power generation such as the solar power generation and the solar thermal power generation, in which sunlight is used. Therefore, when a light receiving surface of the solar cell array (that is, a solar cell module) or the condensing mirror gets dirty, in the solar power generation, light transmission of a cover glass constituting the light receiving surface of the solar cell module degrades according to a level of dirt to decrease a power generation amount. In the solar thermal power generation, a reflection rate of the condensing mirror degrades to decrease the power generation amount. That is, in the solar power generation or solar thermal power generation, when the light receiving surface of the solar cell module or condensing mirror gets dirty, power generation performance degrades largely. Therefore, it is necessary to properly clean the solar cell array and the like to remove dirt on the light receiving surface of the solar cell array and the like.

The facility provided in a standard home can periodically be cleaned by a person. On the other hand, because the large-scale solar power generation facility has a huge surface area, it is difficult for a person to clean to remove dirt on the surface of the solar cell array. For example, assuming that a 1-megawatt solar power generation facility is constructed with solar cell modules each of which has power generation output of 100 watts, 10000 solar cell modules are provided in the whole solar power generation facility. In the case that one solar cell module has a 1-square-meter area, the area to be cleaned becomes 10000 square meters. Plural solar cell arrays each of which has a set of plural solar cell modules are provided in the solar power generation facility, the area of solar cell array ranges from about 50 square meters to about 1000 square meters although it depends on various field conditions. Accordingly, in the large-scale solar power generation facility, it is necessary to introduce the autonomous-travel cleaning robot that can run on the solar cell array and the like in an automatic or remote control manner.

Nowadays, various autonomous-travel cleaning robots that automatically clean a floor of a building are developed, and the autonomous-travel cleaning robots that clean the floor are available in the market. It is conceivable that the autonomous-travel cleaning robot is used as the robot that cleans the solar cell array.

PRIOR ART DOCUMENT

Patent Document

Patent Document 1: JP-A-2004-166968

SUMMARY OF THE INVENTION

Problems to be Solved by the Invention

The above solar cell array has an extremely large surface area, so that it is necessary to efficiently clean the solar cell array. The solar cell array is formed by arraying the plural solar cell modules or mirrors, and frequently a gap of several millimeters to several centimeters is formed between the adjacent solar cell modules or mirrors in order to ensure installation workability or to accept thermal expansion of the solar cell module or the mirror. The gap becomes a resistance when the self-propelled cleaning robot moves between the solar cell modules or mirrors.

Sometimes a member coupling the adjacent solar cell modules or mirrors is provided in the gap. Sometimes a step is formed by the member, and the member and the step also become the resistance against the movement of the self-propelled cleaning robot.

On the other hand, the previously-developed self-propelled cleaning robot is designed on the basis that the self-propelled cleaning robot cleans a floor surface on which little gap or step exists. Therefore, in the case that the conventional self-propelled cleaning robot cleans the solar cell array or the condensing mirror, the gap or the step becomes an obstacle to the movement of the self-propelled cleaning robot, and possibly the self-propelled cleaning robot insufficiently performs the cleaning or has some places where the cleaning cannot be performed.

An object of the present invention is to provide a self-propelled cleaning robot that can efficiently perform the cleaning even on the flat surface having the gap or the step.

Means for Solving the Problems

According to a first aspect of the present invention, a self-propelled cleaning robot that self-travels on and cleans a flat surface of a structure, a groove being formed in the flat surface, the self-propelled cleaning robot includes: a robot main body in which a self-propelled moving unit is provided; and a guidance unit that guides movement of the robot main body. The guidance unit includes: a shaft member that is provided so as to be detachably inserted in the groove; and a shaft member moving mechanism that controls the insertion and removal of the shaft member with respect to the groove. The robot main body is provided so as to be turnable about the shaft member in a state in which the shaft member of the guidance unit is inserted in the groove.

According to a second aspect of the present invention, in the first aspect, plural grooves parallel to each other are formed in the flat surface, the pair of guidance units is provided so as to sandwich the robot main body therebetween, and the pair of guidance unit is provided such that a distance between the shaft members in the pair of guidance units is equal to a distance between the adjacent grooves formed in the flat surface.

According to a third aspect of the present invention, in the first or second aspect, the movement of the robot main body is controlled such that the robot main body moves along the groove, and the guidance unit includes: a pair of guide members that is provided so as to sandwich the shaft member therebetween in a moving direction of the robot main body; and a guide member moving mechanism that detachably inserts a leading end portion of the pair of guide member in the groove.

According to a fourth aspect of the present invention, in the third aspect, the shaft member moving mechanism includes the shaft member moving unit that causes the shaft member to be inserted and removed with respect to the groove, and the guide member moving mechanism swings the guide member along the moving direction of the robot main body.

According to a fifth aspect of the present invention, in the third or fourth aspect, the guide member includes a meandering detector that detects meandering of the robot main body.

According to a sixth aspect of the present invention, in the fifth aspect, the meandering detector includes a link mechanism that can swing along a width direction of the groove.

Effect of the Invention

In the first aspect of the present invention, when the shaft member of the guidance unit is inserted in the groove, the shaft member becomes a guide to move the robot main body, so that the cleaning can stably be performed. Even if an obstacle exists in the groove, the robot main body can continuously move when the shaft member is detached from the groove by the shaft member moving mechanism at the position of the groove. The groove is turned about the shaft member while the shaft member is inserted in the groove, which allows the robot main body to move stably when the robot main body crosses over the groove.

In the second aspect, the robot main body moves while the shaft members are inserted in the pair of grooves, so that the robot main body can move stably along the flat surface between the grooves. Additionally, because the shaft member constituting the turning shaft can be switched, a freedom degree of an attitude of the robot main body during the turning of the robot main body can be enhanced.

In the third aspect, the movement of the robot main body can be stabilized even by the pair of guide member. When the obstacle exists in the groove, the robot main body moves while at least one of the pair of guide members and the shaft member is inserted in the groove. Therefore, the robot main body can move stably when passing the obstacle in the groove.

In the fourth aspect, the guide member is detached from the groove while the movement of the robot main body is continued, so that work efficiency can be improved.

In the fifth aspect, the meandering of the robot main body can be detected, so that the meandering of the robot main body can be corrected. Therefore, the robot main body can stably be moved along a groove direction.

In the sixth aspect, a resistance is decreased when the robot main body moves (for example, meanders) in the width direction of the groove, so that the movement in the groove direction can stably be continued.

BRIEF DESCRIPTION OF THE DRAWINGS

FIG. 8 is a schematic explanatory view illustrating an operation of the guidance unit 40 when the self-propelled cleaning robot 1 of the embodiment passes an obstacle OB.

FIG. 9 is a schematic explanatory view illustrating the operation of the guidance unit 40 when the self-propelled cleaning robot 1 of the embodiment passes the obstacle OB.

FIG. 12 is a schematic explanatory view illustrating the operation of the guidance unit 50 when the self-propelled cleaning robot 1 including another guidance unit 50 passes the obstacle OB.

FIG. 13 is a schematic explanatory view illustrating the operation of the guidance unit 50 when the self-propelled cleaning robot 1 including another guidance unit 50 passes the obstacle OB.

FIG. 14 is a schematic explanatory view illustrating a meandering state of the self-propelled cleaning robot 1.

FIG. 15 is a view illustrating activation of a meandering detector 60 when the self-propelled cleaning robot 1 snakes.

MODE FOR CARRYING OUT THE INVENTION

A self-propelled cleaning robot of the present invention is a robot that cleans a flat portion of a structure, and the self-propelled cleaning robot has a feature that cleaning work can efficiently be performed even if a gap or a step is formed in the flat portion.

The structure that becomes a cleaning target of the self-propelled cleaning robot of the present invention is a structure including a flat surface, but there is no particular limitation to the structure as long as a self-propelled cleaning robot 1 can move along the flat surface. Examples of the structure include a solar cell array of a large-scale solar power generation facility, a condensing mirror in a solar thermal power generation facility, and a solar water heater. Examples of the flat surface to be cleaned include a surface (that is, light receiving surface of solar cell module) of the solar cell array, a surface (that is, light receiving surface of mirror) of the condensing mirror, and a light receiving surface of the solar water heater. In the description, the flat surface is a concept including not only a flat surface that is of a level surface like a solar cell array but also a substantially flat curved surface having a large curvature radius like a condensing mirror.

The case that plural structure bodies (modules) are arrayed to form a structure and a flat surface thereof will be described below. The plural structure bodies (modules) correspond to the solar cell modules or the mirrors, and the structure corresponds to the solar cell array or the condensing mirror.

Hereinafter, the plural structure bodies (modules) are referred to as modules M, and the structure is referred to as a structure SP. A cleaning target surface (that is, each light receiving surface) of the structure SP is referred to as a target flat surface SF, and a surface of each module M is simply referred to as a surface S.

(Description of Self-Propelled Cleaning Robot 1)

Figure 1:
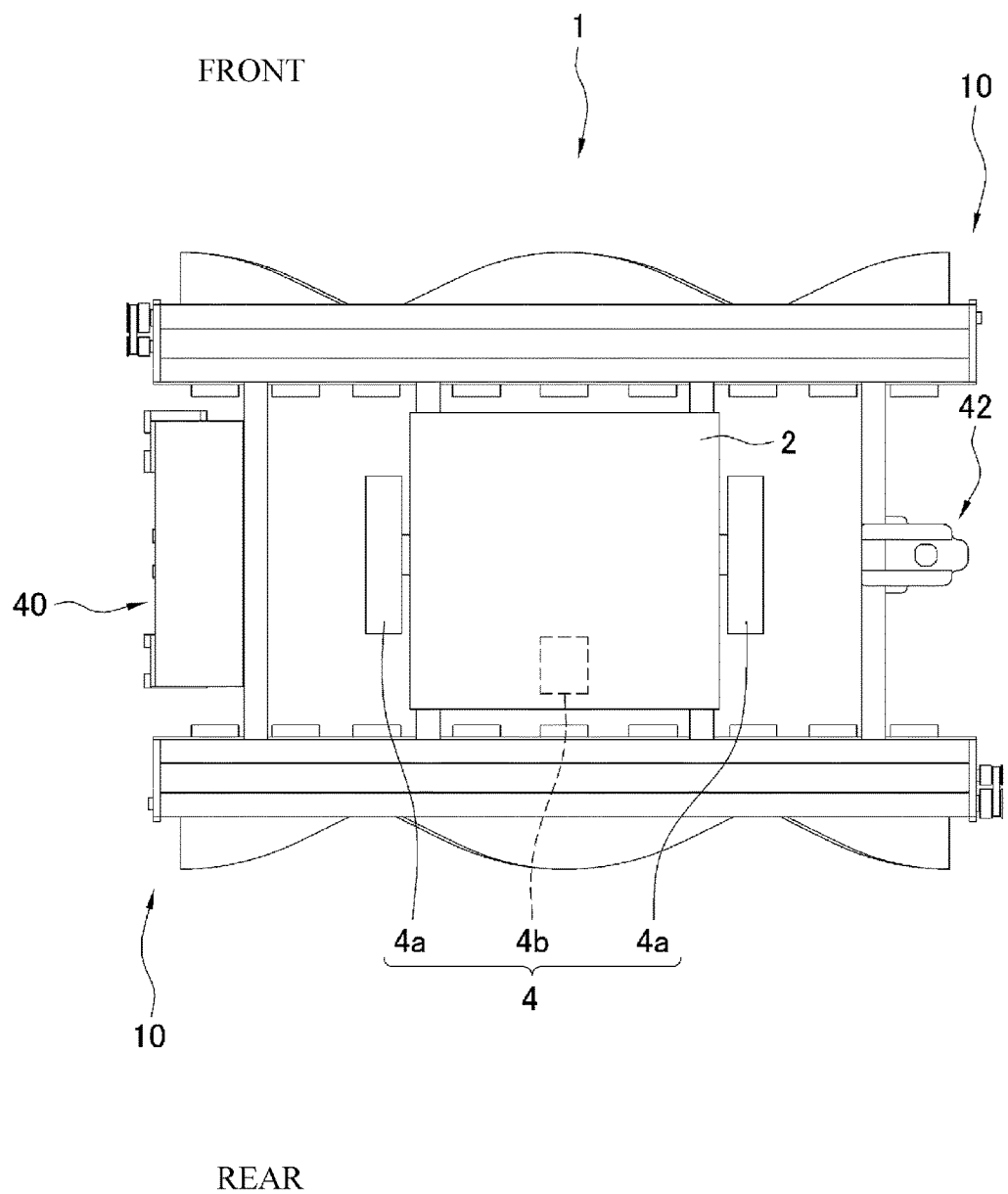
FIG. 1 is a schematic plan view illustrating a self-propelled cleaning robot 1 according to an embodiment.

As illustrated in FIG. 1, an self-propelled cleaning robot 1 according to an embodiment includes a robot main body 2 provided with a moving means 4 traveling on the target flat surface SF of the structure SP, a pair of cleaning units 10 and 10 provided in the robot main body 2, and a controller that controls activation of the moving means 4 or the pair of cleaning units 10 and 10.

The robot main body 2 includes a guidance unit 40 that guides movement of the robot main body 2 when the robot main body 2 moves on the target flat surface SF.

In the self-propelled cleaning robot 1 of the embodiment, the movement of the robot main body 2 can be guided by the guidance unit 40 when the robot main body 2 moves along the surface S of the module M, or when the robot main body 2 moves between the modules M.

Before the description of a structure and activation of the guidance unit 40 that is one of features of the self-propelled cleaning robot 1 of the embodiment, other structures of the self-propelled cleaning robot 1 will be described.

(Robot Main Body 2)

Figure 2:
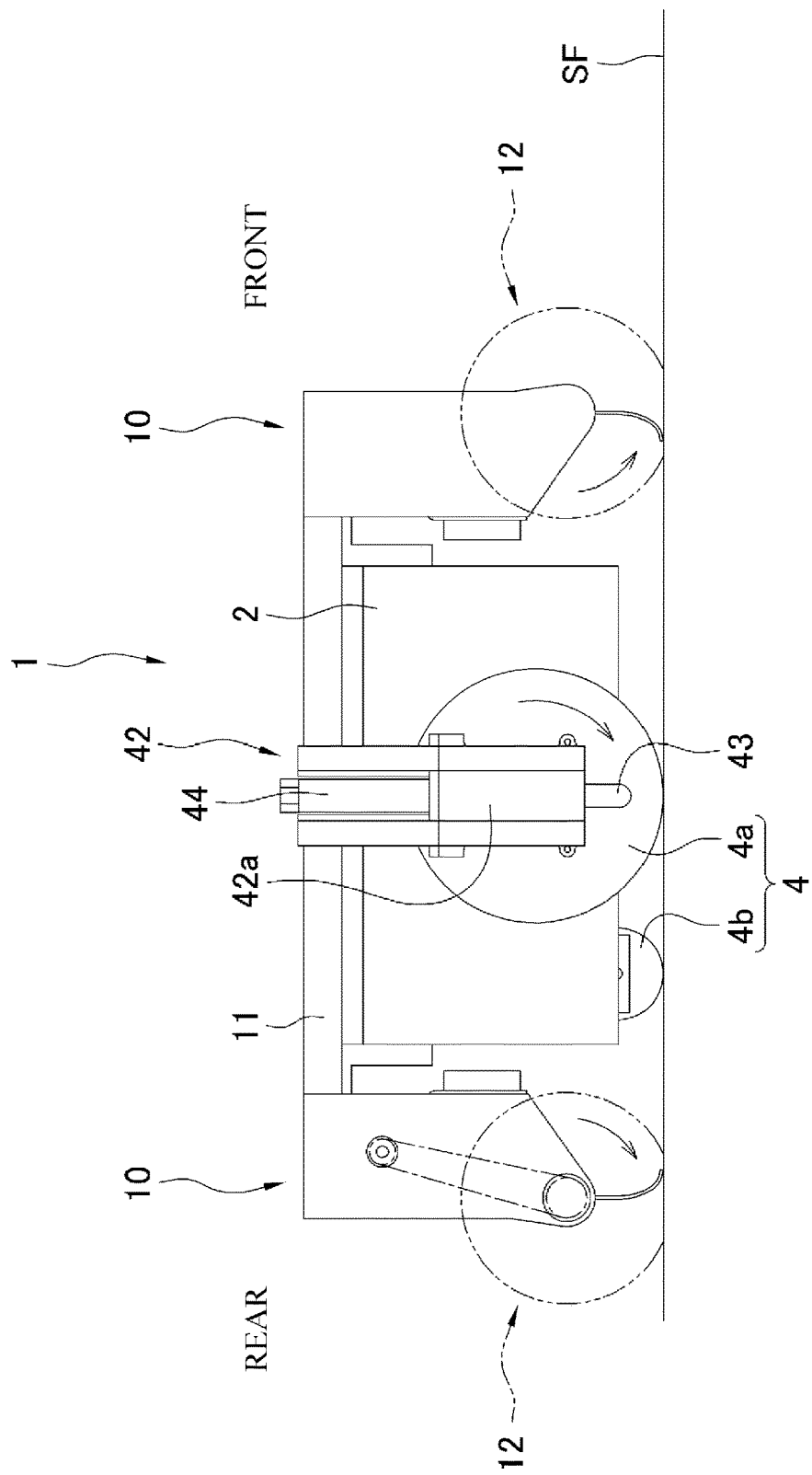
FIG. 2 is a schematic right side view illustrating the self-propelled cleaning robot 1 of the embodiment.
Figure 3:
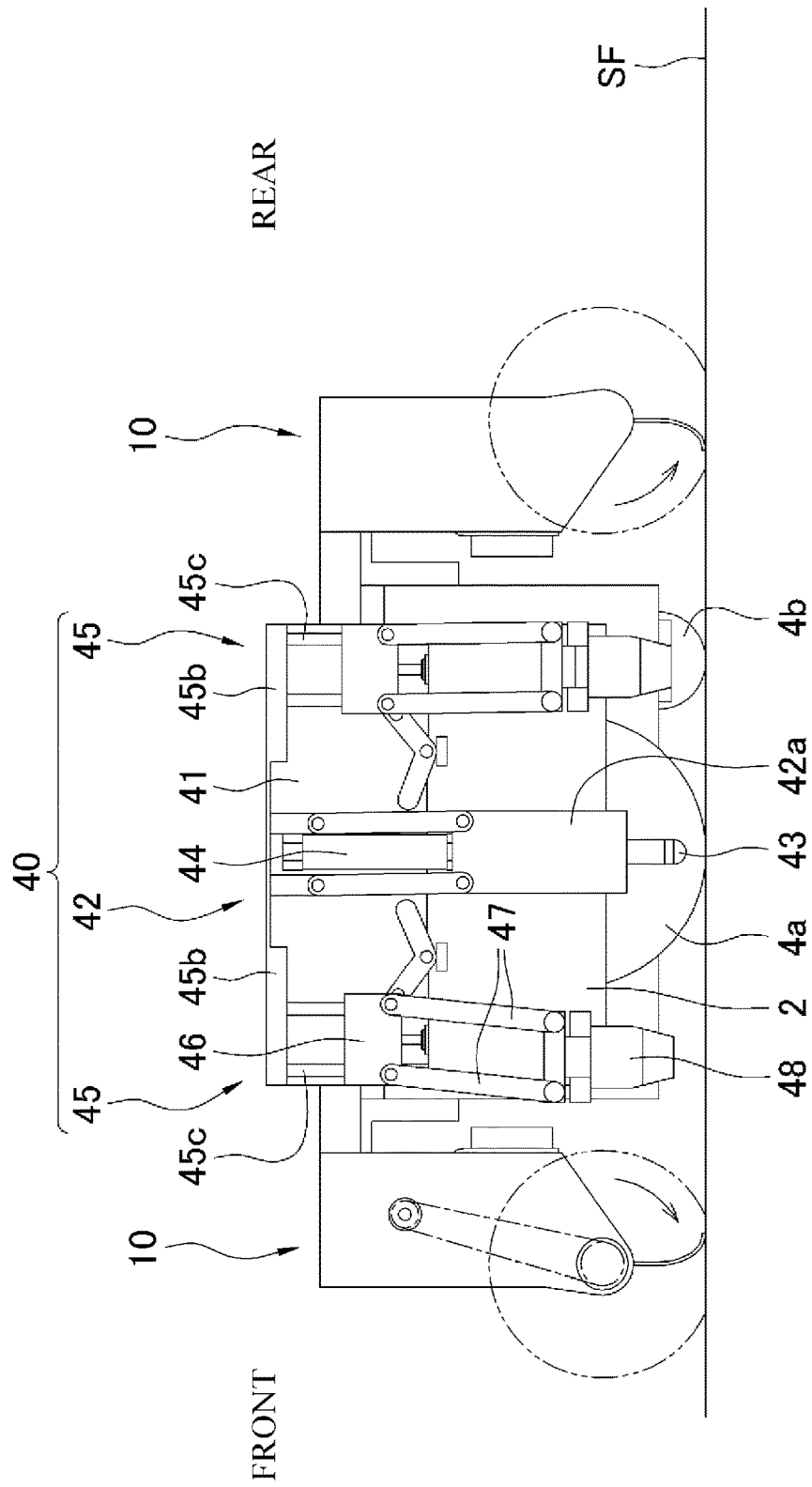
FIG. 3 is a schematic left side view illustrating the self-propelled cleaning robot 1 of the embodiment.

As illustrated in FIGS. 1 to 3, the robot main body 2 includes a moving mechanism 4 that moves the self-propelled cleaning robot 1 along the target flat surface SF of the structure SP.

The moving mechanism 4 includes a pair of lateral driving wheels 4a and 4a and an intermediate driving wheel 4b. Specifically, the pair of lateral driving wheels 4a and 4a and the intermediate driving wheel 4b are arranged so as to form a triangle in planar view (see FIG. 1).

Therefore, the self-propelled cleaning robot 1 can stably be arranged on the target flat surface SF.

A general wheel that can rotate only about a rotation shaft is used as the pair of lateral driving wheels 4a and 4a while an omni wheel (omni-directional movable wheel) is used as the intermediate driving wheel 4b. All the driving wheels 4a and 4b of the moving mechanism 4 are connected to driving motors, respectively, and the driving motor can independently drive each of the driving wheels 4a and 4b. Rotation speed of all the driving motors are controlled by a controller provided in the robot main body 2.

When the controller controls the rotation speed of each driving motor, the self-propelled cleaning robot 1 can linearly or turnably be moved.

In the robot main body 2, a direction in which a side surface where a pair of lateral driving wheels 4a and 4a is not provided exists (in FIG. 2, a vertical direction) is referred to as a front-rear direction of the self-propelled cleaning robot 1. Hereinafter, a side (in FIG. 1, a lower side) of an intermediate driving wheel 4b with respect to the pair of lateral driving wheels 4a and 4a is referred to as a rear portion, and an opposite side (in FIG. 1, an upper side) is referred to as a front portion.

The controller controls the rotation speed of each driving motor to control the movement of the self-propelled cleaning robot 1. A moving passage of the self-propelled cleaning robot 1 is stored in the controller, and the self-propelled cleaning robot 1 may automatically move on the target flat surface SF along the moving passage. The movement of the self-propelled cleaning robot 1 may be controlled by supplying a signal to the controller from the outside. For example, the movement of the self-propelled cleaning robot 1 may remotely be controlled using a remote controller.

The driving wheels 4a,4a,4b is not limited to the above configuration, but the driving wheels 4a,4a,4b may have any configuration as long as the driving wheels 4a,4a,4b can linearly or turnably move the self-propelled cleaning robot 1. For example, the omni wheel that is of the intermediate driving wheel 4b is not used as the driving wheel, but only the pair of driving wheels 4a and 4a may be used as the driving wheel. Instead of the omni wheel, a passive wheel (caster) may be used as the intermediate driving wheel 4b. Even in this case, the moving direction of the self-propelled cleaning robot 1 can freely be changed by adjusting the rotation speed of the pair of driving wheels 4a and 4a. The self-propelled cleaning robot 1 may have a structure similar to that of a usual vehicle. That is, four wheels are provided, and the two front (or rear) wheels may be used as a steering wheel while other wheels are used as a driving wheel, or the four wheels may be used as the driving wheel.

(Cleaning Unit 10)

As illustrated in FIGS. 1 to 3, a pair of cleaning units 10 and 10 is provided in front of and at the rear of the robot main body 2, respectively.

As illustrated in FIGS. 1 and 2, the cleaning unit 10 is coupled to the robot main body 2 by a frame 11. The cleaning unit 10 includes a brush 12. The brush 12 includes a shaft unit 12a and a pair of brush units 12b and 12b that are provided on an outer circumferential surface of the shaft unit 12a.

Both end portions of the shaft unit 12a are rotatably supported by the frame of the cleaning unit 10. Additionally, the shaft unit 12a is provided such that an axis direction of the shaft unit 12a is substantially parallel to the target flat surface SF when the self-propelled cleaning robot 1 is placed on the target flat surface SF.

The pair of brush units 12b and 12b is formed by arraying plural brushes along the axis direction. Each brush unit 12b is provided such that a brush position deviates along a circumferential direction according to the movement of the shaft unit 12a in the axis direction (see FIGS. 1 and 4). In other words, each brush unit 12b is formed into a spiral shape on a side surface of the shaft unit 12a. The pair of brush units 12b and 12b are arranged so as to form a double spiral. That is, the pair of brush units 12b and 12b is formed such that the brushes of the pair of brush units 12b and 12b rotates by 180 degrees with respect to each other in a section orthogonal to the axis direction of the shaft unit 12a (see FIG. 3).

Figure 4:
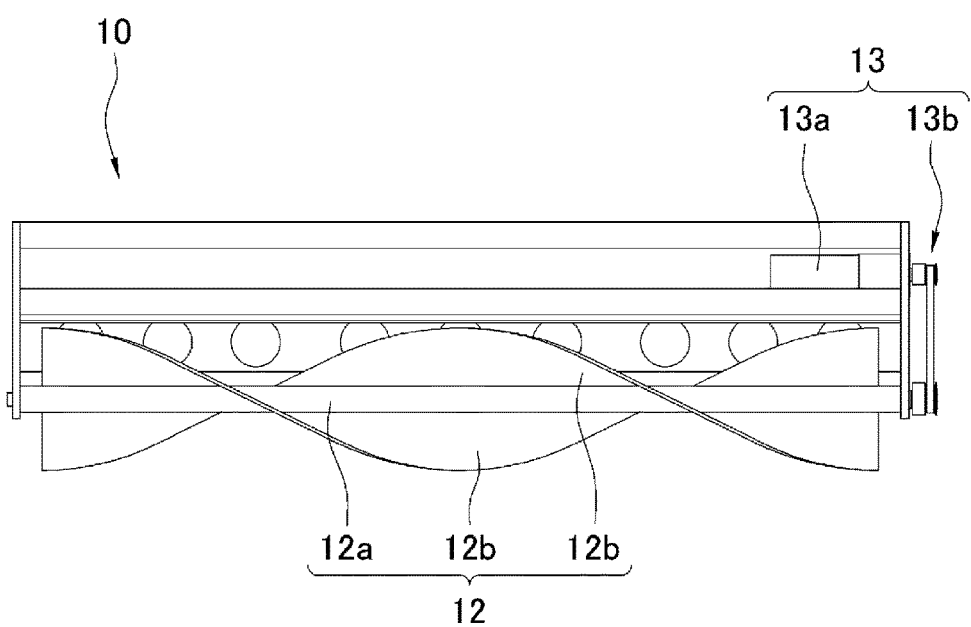
FIG. 4 is a schematic front view illustrating the self-propelled cleaning robot 1 of the embodiment.

As illustrated in FIG. 4, the cleaning unit 10 includes a brush driving unit 13 that rotates the shaft unit 12a about the axis of the brush 12. Specifically, the brush driving unit 13 includes a brush driving motor 13a, and a main shaft of the brush driving motor 13a is coupled to an end portion of the shaft unit 12a of the brush 12 by a belt pulley mechanism 13b. An operating state of the brush driving motor 13a is controlled by the controller.

Therefore, when the brush driving motor 13a is activated, a driving force of the brush driving motor 13a is transmitted to the shaft unit 12a of the brush 12 through the belt pulley mechanism 13b, which allows the brush 12 to be rotated.

There is no particular limitation to a length of the brush constituting the pair of brush units 12b and 12b. The length of the brush may be formed to an extent in which a leading end of the brush comes into contact with the target flat surface SF when the self-propelled cleaning robot 1 is self-traveled on the target flat surface SF. For example, assuming that a distance from the target flat surface SF to an outer circumferential surface of the shaft unit 12a is 37 mm when the self-propelled cleaning robot 1 is placed on the target flat surface, preferably the length of the brush ranges from about 45 mm to about 47 mm. However, the length of the brush depends on other robot parameters such as rigidity of the brush, but the length of the brush is not limited to the above size.

Each brush unit 12b is not necessarily arranged into the spiral shape. Alternatively, for example, the brush may be arranged along the axis direction of the shaft unit 12b. The arrangement of the brush is not particularly limited.

In the embodiment, by way of example, the cleaning unit 10 cleans the target flat surface SF using a brush 12. There is no particular limitation to a method in which the cleaning unit 10 cleans the target flat surface SF. For example, a water sprinkler (such as a spray nozzle) and a wiper blade (squeegee) may be provided in the cleaning unit 10 in addition to the brush 12, or the water sprinkler (such as a spray nozzle) and the wiper blade (squeegee) may be provided in the cleaning unit 10 instead of the brush 12. A vacuum cleaner may be provided in addition to the brush 12, or only the vacuum cleaner may be provided without providing the brush 12.

(Guidance Unit 40)

The guidance unit 40 will be described below.

Hereinafter, in the state in which the self-propelled cleaning robot 1 is placed on the target flat surface SF (hereinafter, referred to as a robot placement state), the side of the target flat surface SF is referred to as below, and the opposite side to the target flat surface SF is referred to as above.

Figure 5:
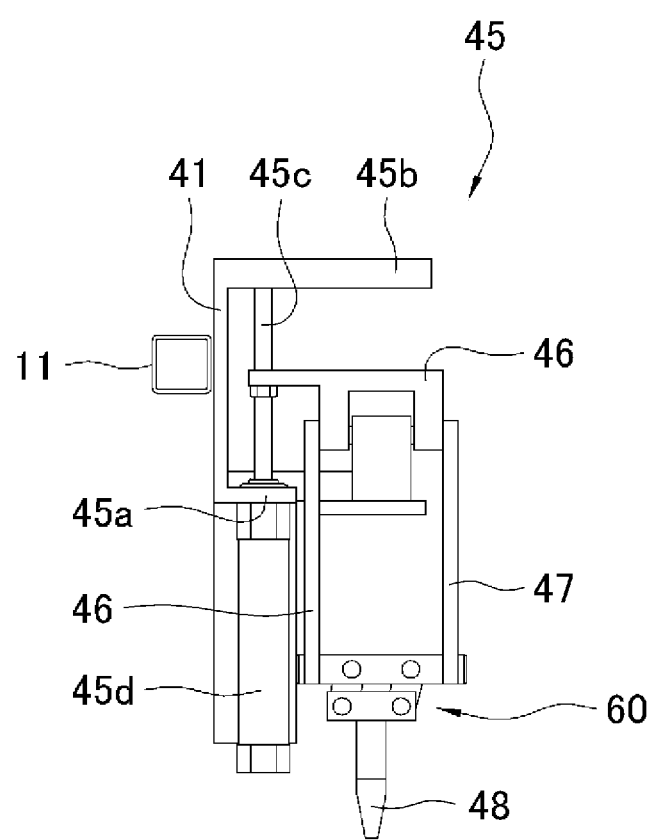
FIG. 5 is a schematic explanatory view illustrating a guidance unit 40.

As illustrated in FIGS. 3 and 5, the guidance unit 40 is attached to a frame 11 with a base member 41 interposed therebetween. A turning guidance unit 42 and a pair of groove movement guidance units 45 and 45 are attached to the base member 41.

(Turning Guidance Unit 42)

The turning guidance unit 42 includes a fixed frame 42a fixed to the base member 41, a shaft member 43, and an air cylinder 44.

The fixed frame 42a is a hollow, box-shaped member, and a through-hole is made in a lower end surface of the fixed frame 42a.

The shaft member 43 is provided in the fixed frame 42a. The shaft member 43 is provided such that a leading end of the shaft member 43 is located in the through-hole of the lower end surface of the fixed frame 42a. The shaft member 43 is also provided such that an axis direction of the shaft member 43 is substantially orthogonal to the lower end surface of the fixed frame 42a. That is, in the robot placement state, the shaft member 43 is also provided such that the axis direction of the shaft member 43 is substantially orthogonal to the target flat surface SF. The shaft member 43 can move along the axis direction.

The air cylinder 44 is provided in the fixed frame 42a. The air cylinder 44 is provided such that the axis direction of the air cylinder 44 is substantially orthogonal to the target flat surface SF in the robot placement state. In other words, the air cylinder 44 is provided such that the axis direction of the air cylinder 44 is substantially parallel to the axis direction of the shaft member 43. A rod of the air cylinder 44 is coupled to a base end portion of the shaft member 43. That is, the shaft member 43 can be moved in the axis direction of the shaft member 43 by activating the rod of the air cylinder 44.

When the air cylinder 44 is activated, the turning guidance unit 42 can cause the leading end of the shaft member 43 to appear from and disappear into the lower end surface of the fixed frame 42a, or change a length in which the leading end of the shaft member 43 projects from the lower end surface of the fixed frame 42a. That is, when the air cylinder 44 is activated, the turning guidance unit 42 can bring or separate the leading end of the shaft member 43 close to or from the target flat surface SF.

Hereinafter, activating the air cylinder 44 to increase a projection amount of the shaft member 43 from the lower end surface of the fixed frame 42a is referred to as expansion of the air cylinder 44. On the other hand, activating the air cylinder 44 to decrease the projection amount of the shaft member 43 from the lower end surface of the fixed frame 42a is referred to as contraction of the air cylinder 44.

There is no particular limitation to the structure of the shaft member moving mechanism 44. In addition to the above mechanism in which the cylinder is used, for example, a structure in which a screw and nut mechanism is used or a structure in which a rack and pinion mechanism is used may be adopted.

(Pair of Groove Movement Guidance Units 45 and 45)

As illustrated in FIG. 3, the pair of groove movement guidance units 45 and 45 is attached to the base member 41 so as to sandwich the turning guidance unit 42 therebetween in the front-rear direction.

The pair of groove movement guidance units 45 and 45 has the substantially identical structure, and is substantially symmetrically provided with respect to the turning guidance unit 42. Accordingly, the groove movement guidance unit 45 located in front (in FIG. 3, the left side) of the turning guidance unit 42 will typically be described below.

As illustrated in FIGS. 3 and 5, in the base member 41, a support bracket 45a is provided upright in front of the turning guidance unit 42. A stopper plate 45b is provided above the support bracket 45a, and a pair of guide rails 45c and 45c is provided along the vertical direction between the stopper plate 45b and the support bracket 45a. The pair of guide rails 45c and 45c is provided such that the axis direction of the pair of guide rails 45c and 45c is substantially orthogonal to the target flat surface SF in the robot placement state. A vertically moving member 46 that is movable along the pair of guide rails 45c and 45c is provided in the pair of guide rails 45c and 45c.

On the other hand, an air cylinder 45d is attached to a bottom surface of the support bracket 45a. The air cylinder 45d is provided such that a rod of the air cylinder 45d is oriented upward, and such that the leading end of the rod projects upward from a top surface of the support bracket 45a. The rod of the air cylinder 45d is coupled to the vertically moving member 46. The reason the air cylinder 45d is provided is described later.

As illustrated in FIGS. 3 and 5, the vertically moving member 46 of the groove movement guidance unit 45 is provided in front of the base member 41. As described above, the vertically moving member 46 is provided so as to be movable along the pair of guide rails 45c and 45c.

A pair of swing arms 47 and 47 is provided in the vertically moving member 46. An upper end of the pair of swing arms 47 and 47 is turnably attached to the vertically moving member 46. Specifically, the pair of swing arms 47 and 47 is provided such that the pair of swing arms 47 and 47 is orthogonal to the target flat surface SF while being parallel to each other, and such that the pair of swing arms 47 and 47 can swing in a plane (hereinafter, simply referred to as an arm swing plane) parallel to the front-rear direction. In the robot placement state, the pair of swing arms 47 and 47 is maintained by a restoration unit such as a spring such that the axis direction of the pair of swing arms 47 and 47 is orthogonal to the target flat surface SF.

As illustrated in FIGS. 3 and 5, a guide member 48 is provided at a lower end of the pair of swing arms 47 and 47 with a meandering detector 60 interposed therebetween. The guide member 48 is a plate-like member, and the guide member 48 is provided such that the surface of the guide member 48 is substantially parallel to the arm swing plane. Additionally, the guide member 48 is provided so as to be aligned with the shaft member 43 of the turning guidance unit 42 in the front-rear direction. When a plane, which passes through a medium in a thickness direction of the guide member 48 and is parallel to the arm swing plane, is prescribed, the guide member 48 is provided such that the shaft member 43 of the turning guidance unit 42 is located in the plane.

As to a positional relationship between the pair of groove movement guidance units 45 and 45 and the pair of guide members 48 and 48, the shaft member 43 is provided so as to be sandwiched between the pair of guide members 48 and 48.

Thus, in the robot placement state, while a force is not applied to guide member 48 in the front-rear direction, the pair of swing arms 47 and 47 is maintained by the restoration unit such as the spring such that the axis direction of the pair of swing arms 47 and 47 is orthogonal to the target flat surface SF.

When the force is applied to the guide member 48 in the front-rear direction, the pair of swing arms 47 and 47 swings to move in the front-rear direction and the upward direction.

On the other hand, when the force applied to the guide member 48 is removed, the pair of swing arms 47 and 47 swings so as to return to an original state (a state orthogonal to the target flat surface SF) by the restoration unit such as the spring. Therefore, the guide member 48 returns to a state (a position in the front-rear direction and a height in the vertical direction) before the application of the force.

The groove movement guidance unit 45 includes a mechanism that detects the swings of the swing arms 47 and 47. The groove movement guidance unit 45 is configured to contract the air cylinder 44 when detecting that the swings of the swing arms 47 and 47 of the groove movement guidance unit 45 located in front of the shaft member 43 of the turning guidance unit 42 is greater than or equal to a predetermined amount. For example, a sensor detects the swings of the swing arms 47 and 47 of the groove movement guidance unit 45 located in front of the shaft member 43 of the turning guidance unit 42, and the air cylinder 44 is activated so as to be contracted in response to a signal from the sensor.

On the other hand, the groove movement guidance unit 45 is configured to expand the air cylinder 44 when detecting that the swings of the swing arms 47 and 47 of the groove movement guidance unit 45 located at the rear of the shaft member 43 of the turning guidance unit 42 is greater than or equal to a predetermined amount. For example, the sensor detects the swings of the swing arms 47 and 47 of the groove movement guidance unit 45 located at the rear of the shaft member 43 of the turning guidance unit 42, and the air cylinder 44 is activated so as to be expanded in response to the signal from the sensor.

(Operation of Self-Propelled Cleaning Robot 1 of the Embodiment)

The work to clean the target flat surface SF with the self-propelled cleaning robot 1 will be described below.

Figure 7:
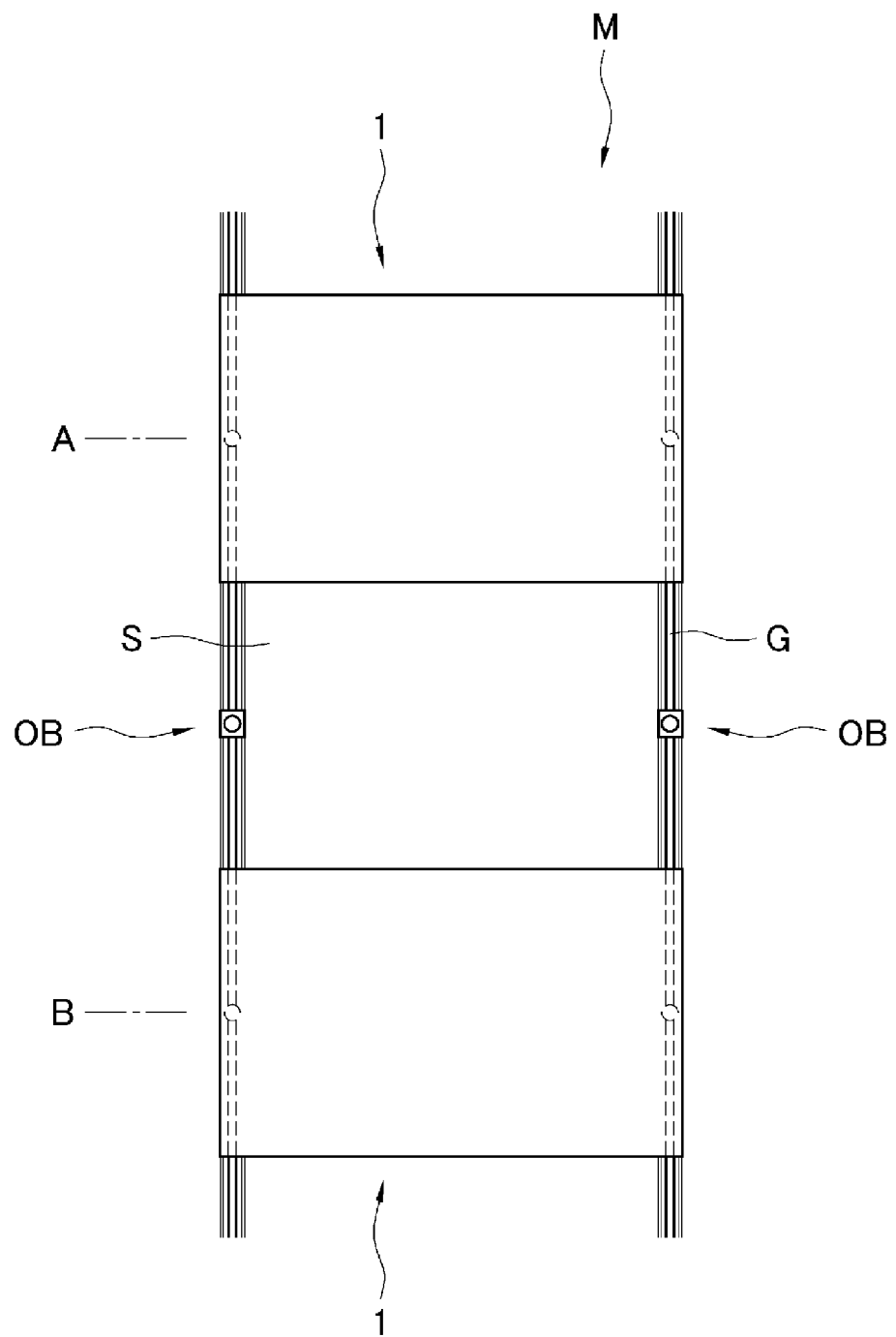
FIG. 7 is a schematic plan view illustrating a state in which the self-propelled cleaning robot 1 of the embodiment moves on a module M.

As illustrated in FIG. 7, it is assumed that a gap G is formed between long sides of the module M, and that a member (obstacle OB) coupling the adjacent solar cell modules is located in the gap G.

It is also assumed that the width of the self-propelled cleaning robot 1, namely, the width of the brush 12 is substantially equal to the width of the module M, and that the self-propelled cleaning robot 1 moves along a longitudinal direction (in FIG. 7, the vertical direction) of the module M to clean the surface S of the module M.

(Normal Movement)

In the case that the self-propelled cleaning robot 1 of the embodiment moves along the longitudinal direction of the module M, the self-propelled cleaning robot 1 is arranged on the surface S of the module M such that the shaft member 43 of the turning guidance unit 42 of the guidance unit 40 and the pair of guide members 48 and 48 of the pair of groove movement guidance units 45 and 45 are inserted in the groove G.

At this point, the self-propelled cleaning robot 1 travels using the moving means 4 while the brush 12 of the cleaning unit 10 is rotated. The shaft member 43 and the pair of guide members 48 and 48 move by following the grooves G, so that the self-propelled cleaning robot 1 can be moved along the longitudinal direction of the module M.

As illustrated in FIG. 7, when the width of the brush 12 of the self-propelled cleaning robot 1 is set to the width of the module M, the whole width of the surface S of the module M can be cleaned only by moving the self-propelled cleaning robot 1 along the longitudinal direction of the module M once.

(Movement to Pass Obstacle OB)

The operation of the guidance unit 40 in the case that the self-propelled cleaning robot 1 passes an obstacle OB like the movement from a position B to a position A in FIG. 7 will be described below with reference to FIGS. 8 and 9.

In order to easily understand the movement of the guidance unit 40, the portions other than the guidance unit 40 are omitted in FIGS. 8 and 9.

In the state in which the obstacle OB does not exist in the groove G, the self-propelled cleaning robot 1 moves along the groove G while the leading end of the shaft member 43 of the guidance unit 40 and the leading end of the pair of guide members 48 and 48 are inserted in the groove G (FIGS. 8(A) and 8(B)).

Then, in the guidance unit 40, the guide member 48 (hereinafter, referred to as a front guide member 48) located in front of the shaft member 43 in a traveling direction comes into contact with the obstacle OB. A force is applied to the front guide member 48 from the obstacle OB according to a moving speed of the self-propelled cleaning robot 1. However, because the front guide member 48 is supported by the pair of swing arms 47 and 47 while being swingable in the front-rear direction, even if the front guide member 48 comes into contact with the obstacle OB, the front guide member 48 moves in the upward direction and the opposite direction to the traveling direction of the self-propelled cleaning robot 1.

When the self-propelled cleaning robot 1 moves along the groove G while the front guide member 48 is in contact with the obstacle OB, the swing arms 47 and 47 swing largely, and the lower end of the front guide member 48 moves to a neighborhood at the upper end of the obstacle OB.

When the sensor detects the swing, the air cylinder 44 is contracted, and therefore the leading end of the shaft member 43 is moved so as to separate from the target flat surface SF. Specifically, the leading end of the shaft member 43 is moved to the position above the upper end of the obstacle OB (FIGS. 8(C) and 8(D)).

When the self-propelled cleaning robot 1 further moves along the groove G, the shaft member 43 passes the position of the obstacle OB. At this point, the shaft member 43 passes above the obstacle OB. Because the leading end of the shaft member 43 is maintained while moved to the position above the upper end of the obstacle OB, the shaft member 43 does not become the obstacle against the movement of the self-propelled cleaning robot 1 (FIGS. 9(E) and 9(F)).

Additionally, because the guide member 48 (hereinafter, referred to as a rear guide member 48) located at the rear of the shaft member 43 in the traveling direction is inserted in the groove G, the self-propelled cleaning robot 1 moves stably along the groove G.

Because the front guide member 48 crosses over the obstacle OB in this period, the pair of swing arms 47 and 47 to which the front guide member 48 is attached returns to the original state, and the leading end of the front guide member 48 is inserted in the groove G again. That is, when the shaft member 43 passes above the obstacle OB, the front guide member 48 is also inserted in the groove G, and the pair of guide members 48 and 48 is substantially inserted in the groove G.

When the self-propelled cleaning robot 1 further moves along the groove G, the rear guide member 48 comes into contact with the obstacle OB. Similarly to the front guide member 48, the rear guide member 48 moves in the upward direction and the opposite direction to the traveling direction of the self-propelled cleaning robot 1.

When the sensor detects the swing, the air cylinder 44 is expanded, and therefore the leading end of the shaft member 43 is inserted in the groove G again (FIGS. 9(G) and 9(H)).

Because the guidance unit 40 is activated as described above, the self-propelled cleaning robot 1 can stably be moved along the groove G, and the self-propelled cleaning robot 1 can continuously be moved along the groove G even if the obstacle OB exists in the groove G.

The pair of swing arms 47 and 47 corresponds to the guide member moving mechanism of claims.

In the embodiment, both the leading ends of the pair of guide members 48 and 48 are arranged in the groove G in the case other than the case that the self-propelled cleaning robot 1 crosses over the obstacle OB.

Alternatively, only the leading end of one of the pair of the guide members 48 and 48 may usually be arranged in the groove G.

For example, in the case that the self-propelled cleaning robot 1 travels in a portion in which the obstacle OB does not exist, while the leading end of the front guide member 48 is arranged in the groove G, the leading end of the rear guide member 48 is detached from the groove G. The air cylinder 45d (hereinafter, referred to as a front air cylinder 45d) located in front of the shaft member 43 is contracted, and the front guide member 48 is lowered together with the vertically moving member 46. On the other hand, the air cylinder 45d (hereinafter, simply referred to as a rear air cylinder 45d) located at the rear of the shaft member 43 is expanded, and the rear guide member 48 is pushed up together with the vertically moving member 46.

When the front guide member 48 comes into contact with the obstacle OB to swing by a predetermined angle, the sensor detects the swing, the front air cylinder 45d is expanded, and the front guide member 48 moves above the obstacle OB. On the other hand, the rear air cylinder 45d is contracted, and the rear guide member 48 is lowered to the position where the leading end of the rear guide member 48 is inserted in the groove G.

The shaft member 43 passes the obstacle OB, and the rear guide member 48 comes into contact with the obstacle OB to swing by a predetermined angle. Therefore, the rear air cylinder 45d is expanded, and the rear guide member 48 moves above the obstacle OB. On the other hand, the front air cylinder 45d is contracted, and the front guide member 48 is lowered to the position where the leading end of the front guide member 48 is inserted in the groove G.

When the pair of guide members 48 and 48 is activated as described above, a possibility that the pair of guide members 48 and 48 and the module M come into contact with each other is decreased compared with the case that both the leading ends of the guide members 48 and 48 are inserted in the groove G, so that the self-propelled cleaning robot 1 can smoothly travel.

In the embodiment, the fixed frame 42a holding the shaft member 43 is fixed to the base member 41, and the pair of guide members 48 and 48 is swung by the pair of swing arms 47 and 47. Alternatively, the fixed frame 42a holding the shaft member 43 may swing with respect to the base member 41. In this case, the shaft member 43 can be activated in the substantially same way as the pair of guide members 48 and 48. The activation of the configuration will be described below.

In the case that the self-propelled cleaning robot 1 travels on the portion in which the obstacle OB does not exist, the front air cylinder 45d is contracted to arrange the leading end of the front guide member 48 in the groove G, and the air cylinder 44 is expanded to arrange the leading end of the shaft member 43 in the groove G. On the other hand, the rear air cylinder 45d is expanded to detach the leading end of the rear guide member 48 from the groove G.

When the front guide member 48 comes into contact with the obstacle OB to swing by a predetermined angle, the sensor detects the swing, the front air cylinder 45d is expanded, and the rear guide member 45d is contracted. The front guide member 48 moves above the obstacle OB, and the rear guide member 48 is lowered to the position where the leading end of the rear guide member 48 is inserted in the groove G. At this point, the shaft member 43 is maintained in the state in which the leading end of the shaft member 43 is inserted in the groove G. That is, the shaft member 43 and the rear guide member 48 are inserted in the groove G.

When the self-propelled cleaning robot 1 further moves, the shaft member 43 comes into contact with the obstacle OB to swing the shaft member 43 (that is, the fixed frame 42a). When the shaft member 43 swings by a predetermined angle, the sensor detects the swing, the air cylinder 44 is contracted, and the shaft member 43 moves above the obstacle OB. At this point, the front air cylinder 45d is contracted, and the front guide member 48 is lowered to the position where the leading end of the front guide member 48 is inserted in the groove G. On the other hand, the rear guide member 48 is maintained in the state in which the leading end of the rear guide member 48 is inserted in the groove G. That is, the pair of guide members 48 and 48 is inserted in the groove G.

When the self-propelled cleaning robot 1 further moves, the shaft member 43 crosses over the obstacle OB, the rear guide member 48 comes into contact with the obstacle OB, and the rear guide member 48 swings. When the rear guide member 48 swings by a predetermined angle, the sensor detects the swing, the rear air cylinder 45*d* is expanded, and the rear guide member 48 moves above the obstacle OB. On the other hand, the air cylinder 44 is expanded, and the shaft member 43 projects to the position where the leading end of the shaft member 43 is inserted in the groove G. Because the front guide member 48 is maintained in the state in which the leading end of the front guide member 48 is inserted in the groove G, the front guide member 48 and the shaft member 43 are inserted in the groove G. That is, the self-propelled cleaning robot 1 returns to the state in which the self-propelled cleaning robot 1 travels on the portion in which the obstacle OB does not exist.

Even if the obstacle OB exists in the groove G, the self-propelled cleaning robot 1 can continuously move along the groove G. Additionally the two members (that is, the pair of guide members 48, or the shaft member 43 and one of the guide members 48) are always inserted in the groove G, so that the self-propelled cleaning robot 1 can stably move along the groove G.

(Turning Movement)

The self-propelled cleaning robot 1 moves in the following way when moving between the modules M adjacent to each other across the groove G.

The self-propelled cleaning robot 1 stops the movement along the groove G. Then, only the guide members 48 and 48 of the pair of groove movement guidance units 45 and 45 of the guidance unit 40 are detached from the groove G while the shaft member 43 of the turning guidance unit 42 is inserted in the groove G. Specifically, the vertically moving member 46 is elevated by the air cylinder 45*d*, and the guide members 48 and 48 are elevated together with the pair of swing arms 47 and 47.

At this point, a driving motor 4*m* is activated such that the robot main body 2 moves about the shaft member 43 by a movement controller 31 of the self-propelled cleaning robot 1. The self-propelled cleaning robot 1 turns about the shaft member 43.

When being turned by 180 degrees from the original state, the self-propelled cleaning robot 1 can be moved to the adjacent module M. Additionally, the shaft member 43 is inserted in the groove G. Therefore, when the identical modules M are arrayed, a relative positional relationship between the modules M in the width direction can substantially be equalized although the arrangement between the self-propelled cleaning robot 1 and the module M is inverted in the front-rear direction. In the case that the gap G exists between the modules M, the relative positional relationship between the self-propelled cleaning robot 1 and the module M can substantially be equalized even if the self-propelled cleaning robot 1 moves between the modules M.

Accordingly, the self-propelled cleaning robot 1 of the embodiment can clean any module M in the similar state. Because positioning can be performed by turning the self-propelled cleaning robot 1 about the shaft member 43, the self-propelled cleaning robot 1 can easily be positioned to improve the work efficiency.

(For a Pair of Guidance Units 40 and 40)

The guidance unit 40 of the self-propelled cleaning robot 1 may be provided in not only one of the side surfaces of the robot main body 2 but also in both side surfaces. That is, the pair of guidance units 40 and 40 may be provided in the self-propelled cleaning robot 1 so as to sandwich the robot main body 2 therebetween in the axis direction (a direction parallel to the axis direction of a shaft 12*a* of the brush 12) of the pair of driving wheels 4*a* and 4*a*. In this case, a distance between the shaft members 43 of the pair of guidance units 40 and 40 and a distance between the corresponding guide members 48 are set to a distance between the grooves G adjacent to each other (that is, a length substantially equal to the width of the module M). Therefore, substantially the self-propelled cleaning robot 1 is moved along a long side of the module M to be cleaned while the module M is sandwiched in the width direction, so that the self-propelled cleaning robot 1 can more surely be moved along the longitudinal direction of the module M.

In the case that the pair of guidance units 40 and 40 is provided, because the shaft members 43 of the guidance unit 40 exist on both the sides of the self-propelled cleaning robot 1, a freedom degree of an attitude can be enhanced in the following way when the self-propelled cleaning robot 1 moves from one module M to another module M. When the self-propelled cleaning robot 1 moves from one module M to another module M for one guidance unit 40, the front-rear direction of the self-propelled cleaning robot 1 is inverted. However, as illustrated in FIG. 10, when the self-propelled cleaning robot 1 is turned for the pair of guidance unit 40 and 40, the pre-movement and post-movement self-propelled cleaning robots 1 are identical to each other in the orientation of the front-rear direction.

Figure 10:
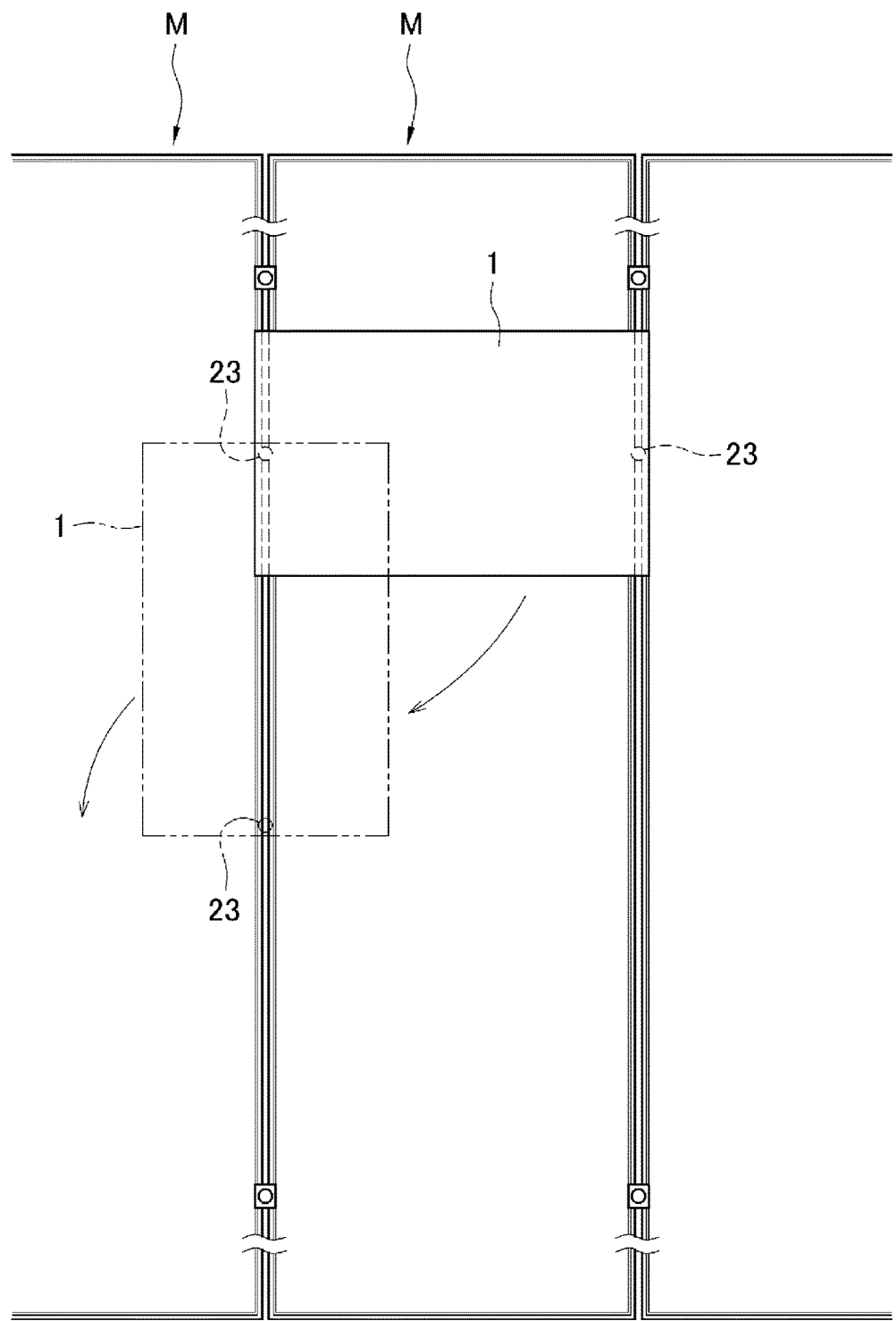
FIG. 10 is a schematic explanatory view illustrating a state in which the self-propelled cleaning robot 1 of the embodiment goes over a gap G to move between adjacent modules M1 and M2.

That is, in FIG. 10, the shaft member 43 (one of the shaft members 43 and 43) of the guidance unit 40 on the left side of the self-propelled cleaning robot 1 is inserted in the groove G, and the self-propelled cleaning robot 1 is turned clockwise by 90 degrees. Then, the shaft member 43 (the other shaft member 43) of the guidance unit 40 located on the right side is inserted in the groove G, and one of the shaft members 43 is detached from the groove G. The self-propelled cleaning robot 1 is turned counterclockwise by 90 degrees about the other shaft member 43. Therefore, the post-movement and pre-movement self-propelled cleaning robots 1 are identical to each other in the orientation of the front-rear direction.

In the case that the pair of guidance units 40 and 40 is provided in the self-propelled cleaning robot 1, the two guidance units 40 having the identical structure are not necessarily provided. For example, only the turning guidance unit 42 may be provided in one of the guidance units 40. When only the turning guidance unit 42 is provided, the self-propelled cleaning robot 1 can be moved from one of the modules M to another module M similarly to the case that the pair of guidance units 40 and 40 is provided.

(Meandering Detector 60)

When the shaft member 43 and the pair of guide members 48 and 48 are inserted in the grooves G, the self-propelled cleaning robot 1 can be moved along the longitudinal direction of the module M. However, as described above, preferably the meandering detector 60 is provided between the pair of swing arms 47 and 47 and the guide member 48 in order that the self-propelled cleaning robot 1 travels stably. Preferably the meandering detector 60 detects the force applied to the guide member 48 from the width direction of the groove G, and transmits the detected force to the movement controller 31. In this case, in the case that the robot main body 2 moves (for example, meanders) in the width direction of the groove G to bring the guide member 48 into contact with the module M, the activation of the driving motor 4m can be controlled such that the meandering of the robot main body 2 is corrected by the movement controller 31. Therefore, a moving resistance of the self-propelled cleaning robot 1 is decreased, so that the self-propelled cleaning robot 1 can stably and continuously move in the longitudinal direction of the module M.

Specifically, in the case that only the turning guidance unit 42 is provided in one of the guidance units 40 as illustrated in FIG. 14, when the self-propelled cleaning robot 1 turns to the right with respect to the traveling direction as illustrated in FIG. 14(B), a force is applied to the guide member 48 located in front of the shaft member 43 so as to press the guide member 48 inward from the outside. In this case, the movement controller 31 controls the activation of the driving motor 4m such that the self-propelled cleaning robot 1 turns to the left. When the self-propelled cleaning robot 1 turns to the left until the force is removed, the movement controller 31 controls the activation of the driving motor 4m such that the self-propelled cleaning robot 1 travels straight. Therefore, the meandering of the self-propelled cleaning robot 1 is corrected.

On the other hand, when the self-propelled cleaning robot 1 turns to the left with respect to the traveling direction as illustrated in FIG. 14(A), a force is applied to the guide member 48 located in front of the shaft member 43 so as to press the guide member 48 outward from the inside. In this case, the movement controller 31 controls the activation of the driving motor 4m such that the self-propelled cleaning robot 1 turns to the right. When the self-propelled cleaning robot 1 turns to the right until the force is removed, the movement controller 31 controls the activation of the driving motor 4m such that the self-propelled cleaning robot 1 travels straight. Therefore, the meandering of the self-propelled cleaning robot 1 is corrected.

Preferably a structure, in which a link mechanism being able to swing the guide member 48 in the width direction of the groove G with respect to the pair of swing arms 47 and 47 and a sensor detecting a swing amount of the guide member 48, is adopted as the meandering detector 60. In this case, when the guide member 48 comes into contact with the module M, a force generated by the contact between the guide member 48 and the module M can be released by the link mechanism.

The meandering correction of the self-propelled cleaning robot 1 in the case that the link mechanism is provided will be described.

In the case that the self-propelled cleaning robot 1 moves along the axis direction of the groove G, the guide member 48 moves with a proper gap between the guide member 48 and the module M (FIG. 15(A)). Because the link mechanism is not activated, the sensor does not transmit the signal to the movement controller 31, but the activation of the driving motor 4m is maintained. That is, the movement controller 31 controls the activation of the driving motor 4m such that the self-propelled cleaning robot 1 travels straight, and the self-propelled cleaning robot 1 is maintained so as to move along the axis direction of the groove G.

On the other hand, as illustrated in FIG. 15(C), when the force is applied to the guide member 48 so as to press the guide member 48 inward from the outside, the link mechanism is activated so as to release the force. When the sensor detects the activation of the link mechanism, the sensor transmits the signal to the movement controller 31, and the movement controller 31 controls the activation of the driving motor 4m so as to correct the meandering. Therefore, because the force applied to the guide member 48 is removed, the link mechanism is activated so as to return to the original state. When the force applied to the guide member 48 is removed, because the sensor stops the transmission of the signal to the movement controller 31, the movement controller 31 recognizes that the meandering is eliminated. Accordingly, the movement controller 31 controls the activation of the driving motor 4m such that the self-propelled cleaning robot 1 travels straight, and the self-propelled cleaning robot 1 returns to the state in which the self-propelled cleaning robot 1 moves along the axis direction of the groove G.

Similarly, as illustrated in FIG. 15(B), when the force is applied to the guide member 48 so as to press the guide member 48 outward from the inside, the link mechanism is activated so as to release the force. When the sensor detects the activation of the link mechanism, the sensor transmits the signal to the movement controller 31, and the movement controller 31 controls the activation of the driving motor 4m so as to correct the meandering. Therefore, because the force applied to the guide member 48 is removed, the link mechanism is activated so as to return to the original state. When the force applied to the guide member 48 is removed, because the sensor stops the transmission of the signal to the movement controller 31, the movement controller 31 recognizes that the meandering is eliminated. Accordingly, the movement controller 31 controls the activation of the driving motor 4m such that the self-propelled cleaning robot 1 travels straight, and the self-propelled cleaning robot 1 returns to the state in which the self-propelled cleaning robot 1 moves along the axis direction of the groove G.

The structure of the meandering detector 60 is not limited to the above structure including the link mechanism, but various structures may be adopted. For example, a contact sensor, a pressure sensor, or a range sensor is provided in the surface of the guide member 48, and the force applied to the guide member 48 or a level of meandering may directly be measured.

(Other Embodiments of Guidance Unit)

In the above guidance unit 40, the pair of groove movement guidance units 45 and 45 inserts the plate-like guide member 48 in the groove G, and the guide member 48 is swung and detached from groove G. In this case, while the self-propelled cleaning robot 1 moves continuously, the self-propelled cleaning robot 1 can pass the obstacle OB by following the groove G. In the above structure, only the three driving wheels 4a, 4a, 4b except the brush 12 in the self-propelled cleaning robot 1 are in contact with the surface S of the module M. In the self-propelled cleaning robot 1, because a reaction force from the surface S of the module M is received only by the three driving wheels 4a, 4a, 4b, a friction between the driving wheels 4a, 4a, 4b and the surface S of the module M can be increased. Accordingly, the self-propelled cleaning robot 1 can obtain an advantage that a slip is hardly generated in the driving wheels 4 when the self-propelled cleaning robot 1 travels. Therefore, the self-propelled cleaning robot 1 can be moved along the surface S of the module M even if an inclination of the surface S of the module M increases (for example, about 15° to about 20°).

On the other hand, the following structure can be adopted as the pair of groove movement guidance units 45 and 45.

A guidance unit 50 in the case that another groove movement guidance unit 55 is used will be described below.

In the guidance unit 50, the description of the component having the structure substantially identical to that of the guidance unit 40 is properly omitted.

Figure 11:
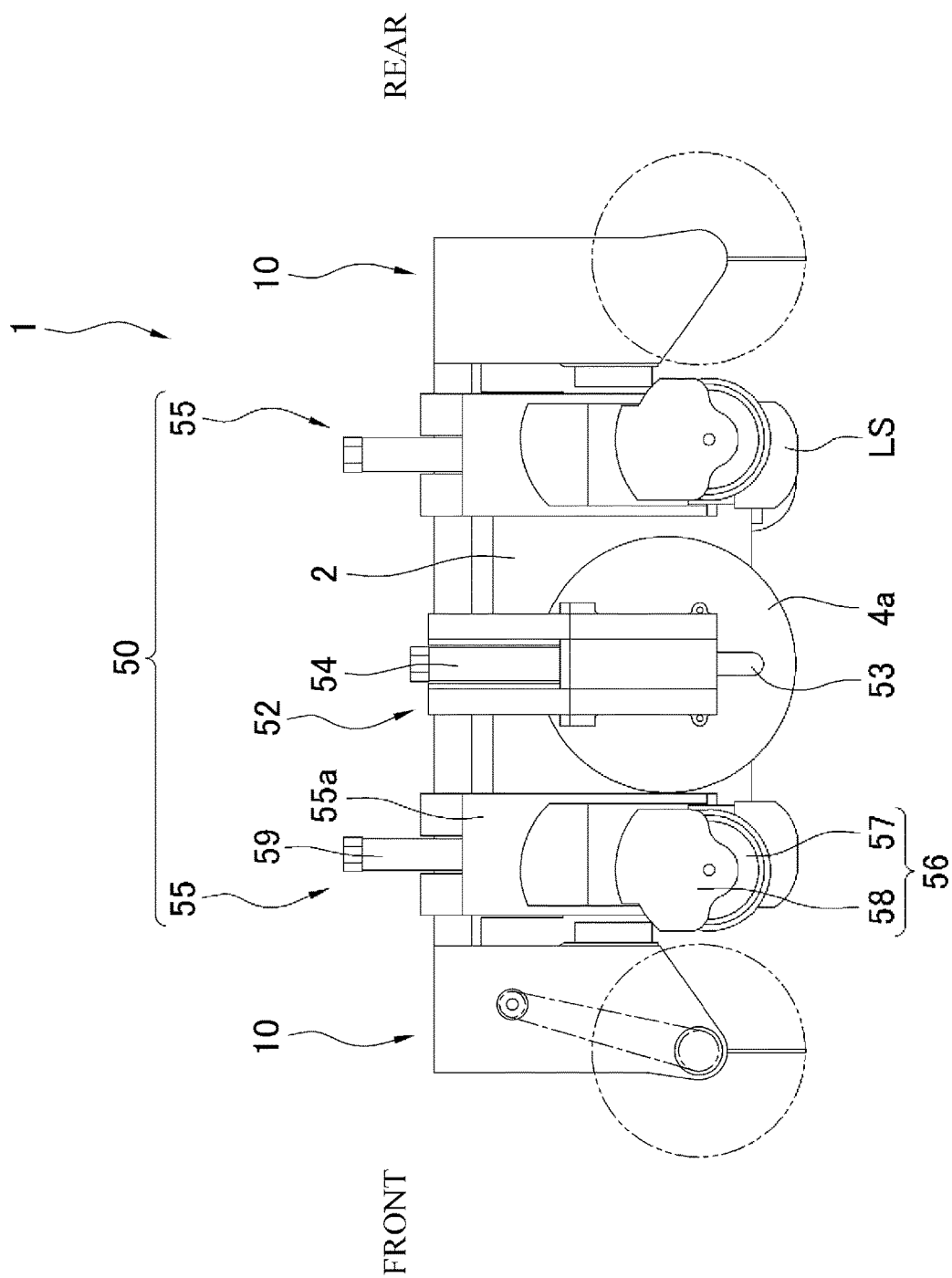
FIG. 11 is a schematic side view illustrating the self-propelled cleaning robot 1 including another guidance unit 50.

As illustrated in FIG. 11, a turning guidance unit 52 having the structure substantially identical to that of the turning guidance unit 42 is attached to the frame 11.

As illustrated in FIG. 11, the pair of groove movement guidance units 55 and 55 is attached to the frame 11 so as to sandwich the turning guidance unit 52 therebetween in the front-rear direction. The groove movement guidance unit 55 includes an air cylinder 59, and, similarly to the groove movement guidance unit 45, the groove movement guidance unit 55 has the function of elevating a wheel block 56 when the self-propelled cleaning robot 1 is turned.

The pair of groove movement guidance units 55 and 55 has the substantially identical structure, and is substantially symmetrically provided with respect to the turning guidance unit 52. Accordingly, the groove movement guidance unit 55 located in front (in FIG. 11, the left side) of the turning guidance unit 52 will typically be described below.

As illustrated in FIG. 11, the groove movement guidance unit 55 includes a fixed frame 55a fixed to the frame 11, a wheel block 56, and a biasing unit biasing the wheel block 56 downward (that is, toward the target flat surface SF).

The fixed frame 55a is a hollow box-shaped member in which a front surface and a bottom surface are opened.

The wheel block 56 is arranged in the fixed frame 55a. The wheel block 56 includes a step-equipped wheel 57 and a cover 58 that accommodates the step-equipped wheel 57 therein. The step-equipped wheel 57 includes a guide wheel unit 57a having a larger diameter and a pair of travel wheel units 57b and 57b located on both sides of the guide wheel unit 57a in a rotation axis direction.

The step-equipped wheel 57 is provided such that the rotation axis direction of the step-equipped wheel 57 is parallel to the axis direction of the driving wheel 4a,4a.

The guide wheel unit 57a of the step-equipped wheel 57 is formed such that the width of the guide wheel unit 57a is narrower than that of the groove G, and such that the width including the pair of travel wheel units 57b and 57b is wider than that of the groove G.

The biasing unit is provided in the fixed frame 55a. For example, the biasing unit is constructed with the spring. The biasing unit biases the wheel block 56 downward (that is, toward the target flat surface SF). When a force pushing up the wheel block 56 is applied to the step-equipped wheel 57, the biasing unit holds wheel block 56 such that the wheel block 56 can move upward according to the force. The biasing unit is also provided such that the wheel block 56, namely, the step-equipped wheel 57 can be elevated and lowered along the direction orthogonal to the target flat surface SF in the robot placement state.

Accordingly, the groove movement guidance unit 55 can bring or separate the step-equipped wheel 57 into contact with or from the target flat surface SF when the force is applied to the step-equipped wheel 57 in the direction substantially orthogonal to the target flat surface SF.

The step-equipped wheel 57 corresponds to the guide member of claims, and the biasing unit corresponds to the guide member moving mechanism of claims. There is no particular limitation to the structure of the guide member moving mechanism as long as the guide member moving mechanism exerts the above function. For example, the spring or an air damper can be used as the guide member moving mechanism.

The groove movement guidance unit 55 includes a mechanism that detects a moving amount of the step-equipped wheel 57. The air cylinder 54 of the turning guidance unit 52 is contracted when the mechanism detects that the step-equipped wheel 57 of the groove movement guidance unit 55 located in front of the shaft member 53 of the turning guidance unit 52 returns to the original position after the step-equipped wheel 57 moves upward by a predetermined amount or more. On the other hand, the air cylinder 54 of the turning guidance unit 52 is expanded when the mechanism detects that the step-equipped wheel 57 of the groove movement guidance unit 55 located at the rear of the shaft member 53 of the turning guidance unit 52 moves upward by the predetermined amount or more.

(Description of Operation of Self-Propelled Cleaning Robot 1 Including Guidance Unit 50)

Figure 6:
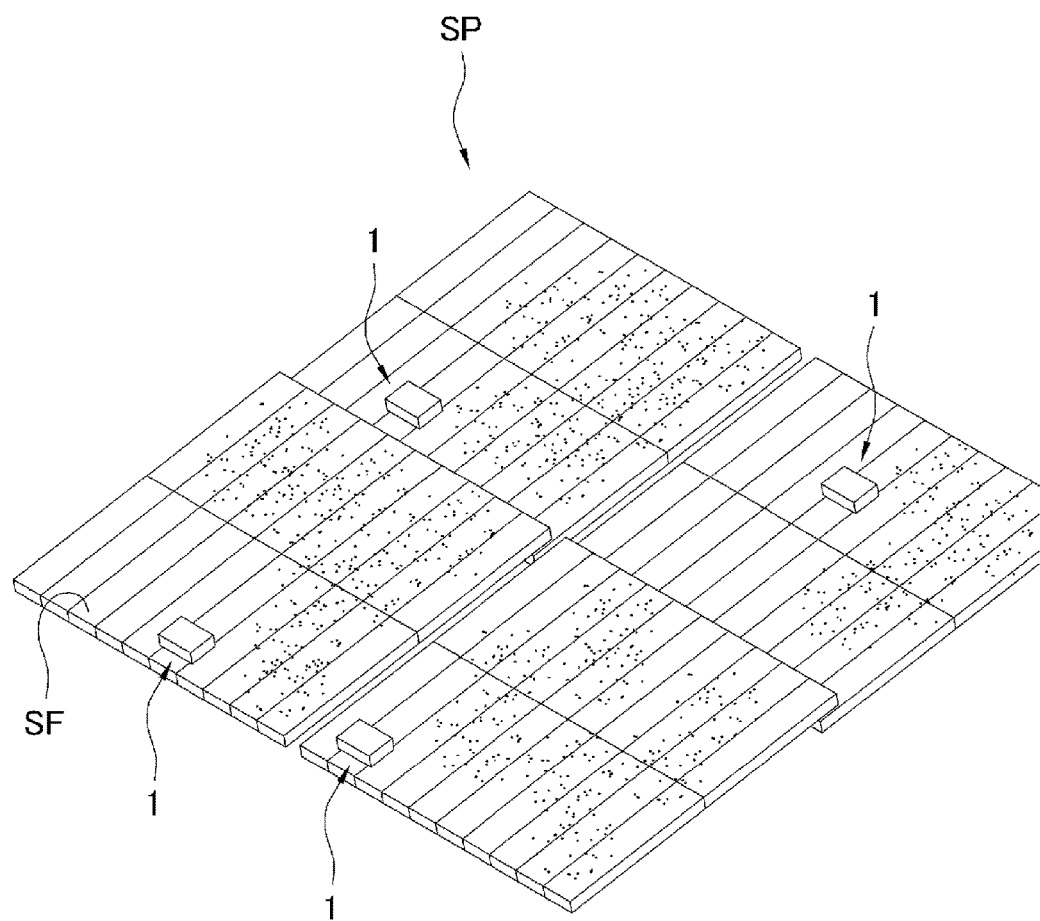
FIG. 6 is a schematic explanatory view illustrating a structure SP cleaned by the self-propelled cleaning robot 1 of the embodiment.

The work to clean the target flat surface SF in FIG. 6 with the self-propelled cleaning robot 1 including the guidance unit 50 will be described below.

(Normal Movement)

In the case that the self-propelled cleaning robot 1 of the embodiment moves along the longitudinal direction of the module M, the self-propelled cleaning robot 1 is arranged on the surface S of the module M such that the shaft member 53 of the turning guidance unit 52 of the guidance unit 50 and the guide wheel unit 57a of the step-equipped wheel 57 of the pair of the groove movement guidance units 59 and 59 are inserted in the groove G. The pair of travel wheel units 57b and 57b of the step-equipped wheels 57 is arranged so as to be in contact with the top surfaces of the portions (in FIG. 6, frame) on both the sides of the groove G.

At this point, the self-propelled cleaning robot 1 travels using the moving means 4 while the brush 12 of the cleaning unit 10 is rotated. The shaft member 53 moves by following the grooves G, and the step-equipped wheel 57 is rolled while the guide wheel unit 57a is inserted in the groove G, so that the self-propelled cleaning robot 1 can be moved along the longitudinal direction of the module M.

(Movement to Pass Obstacle OB)

The operation of the guidance unit 50 in the case that the self-propelled cleaning robot 1 passes the obstacle OB like the movement from the position A to the position B in FIG. 7 will be described below with reference to FIGS. 12 and 13.

In order to easily understand the movement of the guidance unit 50, the descriptions of the portions other than the guidance unit 50 are omitted in FIGS. 12 and 13.

In the state in which the obstacle OB does not exist in the groove G, the self-propelled cleaning robot 1 moves along the groove G while the leading end of the shaft member 53 of the guidance unit 50 and the guide wheel unit 57a of the step-equipped wheel 57 are inserted in the groove G (FIGS. 12(A) and 12(B)).

Then, in the guidance unit 50, the step-equipped wheel 57 located in front of the shaft member 53 in the traveling direction comes into contact with the obstacle OB. The step-equipped wheel 57 of the groove movement guidance unit 55 located in front of the shaft member 53 in the traveling direction moves upward because the force is applied to the step-equipped wheel 57 from the obstacle OB according to the moving speed of the self-propelled cleaning robot 1. In other words, the step-equipped wheel 57 runs onto the obstacle OB (FIGS. 12(C) and 12(D)).

When the self-propelled cleaning robot 1 further moves forward after the step-equipped wheel 57 runs onto the obstacle OB, the step-equipped wheel 57 crosses over the obstacle OB, and the guide wheel unit 57a of the step-equipped wheel 57 is inserted in the groove G again. The air cylinder 54 of the turning guidance unit 52 is contracted, and the leading end of the shaft member 53 moves to the position above the upper end of the obstacle OB. At this point, because the obstacle OB does not reach the position of the shaft member 53, the shaft member 53 does not interfere with the obstacle OB until the leading end of the shaft member 53 moves upward.

When the self-propelled cleaning robot 1 further moves along the groove G, the shaft member 53 passes the position of the obstacle OB. Because the leading end of the shaft member 53 is maintained while moved to the position above the upper end of the obstacle OB, the shaft member 53 does not become the obstacle against the movement of the self-propelled cleaning robot 1 (FIGS. 13(E) and 13(F)).

Additionally, because the guide wheel units 57a of the step-equipped wheels 57 of the two groove movement guidance mechanism units 55 located in front of and at the rear of the shaft member 53 are inserted in the groove G, the self-propelled cleaning robot 1 moves stably along the groove G even if the shaft member 53 is detached from the groove G.

When the self-propelled cleaning robot 1 moves along the groove G, the step-equipped wheel 57 of the groove movement guidance unit 55 located in front of the shaft member 53 in the traveling direction moves upward because the step-equipped wheel 57 located at the rear of the shaft member 53 in the traveling direction comes into contact with the obstacle OB. In other words, the step-equipped wheel 57 runs onto the obstacle OB (FIGS. 13(G) and 13(H)). Because the air cylinder 54 of the turning guidance unit 52 is expanded, the leading end of the shaft member 53 is inserted in the groove G again.

When the step-equipped wheel 57 located at the rear of the shaft member 53 in the traveling direction crosses over the obstacle OB, the self-propelled cleaning robot 1 returns to the state before the passage of the obstacle OB because the guide wheel unit 57a of the step-equipped wheel 57 is inserted in the groove G.

Because the guidance unit 50 is activated as described above, the self-propelled cleaning robot 1 can stably be moved along the groove G, and the self-propelled cleaning robot 1 can continuously be moved along the groove G even if the obstacle OB exists in the groove G.

(Level Sensor LS).

A level sensor LS that sets a reference with respect to the target flat surface SF of the self-propelled cleaning robot 1 may be provided in the guidance unit 50. The level sensor LS is a member in which a bottom surface is formed flat, and the level sensor LS is biased downward by a cylinder or the like. When the self-propelled cleaning robot 1 is placed on the target flat surface SF, the bottom surface of the level sensor LS comes into contact with the target flat surface SF.

The following advantage can be obtained when the level sensor LS is provided.

The attitude of the robot main body 2 is inclined forward or rearward, when one of the pair of lateral driving wheels 4a and 4a of the self-propelled cleaning robot 1 is located on the frame of the solar cell module while the self-propelled cleaning robot 1 moves along the light receiving surface (that is, the target flat surface SF) of the solar cell module. During the movement of the self-propelled cleaning robot 1, the robot main body 2 rarely swings in the front-rear direction in association with the rotation of the brush 12. In the case that the robot main body 2 is inclined in the front-rear direction, possibly one of the front or rear portions of the robot main body 2 becomes floating state while the other portion of the robot main body 2 becomes a sinking state. The step-equipped wheel 57 attached onto the floating side floats from groove G. On the other hand, the step-equipped wheel 57 attached onto the sinking side is pushed up in the direction separating from the traveling surface (target flat surface SF) (that is, receives the reaction force from the frame), a false determination that the obstacle OB exists in the groove G is made to generates a malfunction.

However, when the level sensor LS is provided, a distance in the direction separating from the target flat surface SF is detected based on not the position of the robot main body 2 but the position of the target flat surface SF, so that whether the obstacle OB exists in the groove G can stably be detected irrespective of the change in attitude of the robot main body 2.

INDUSTRIAL APPLICABILITY

The self-propelled cleaning robot of the present invention is suitable for the robot that cleans the solar cell array of the large-scale solar power generation facility, the condensing mirror of the large-scale solar thermal power generation facility, the light receiving surface in the solar water heater, and the like.

DESCRIPTION OF REFERENCE SIGNS

1 self-propelled cleaning robot
2 robot main body
10 cleaning unit
12 brush
12a shaft unit
12b brush unit
40 guidance unit
43 shaft member
44 air cylinder
45 groove movement guidance unit
48 guide member
50 guidance unit
53 shaft member
55 groove movement guidance unit
57 step-equipped wheel
59 air cylinder
60 meandering detector
SP structure
SF target flat surface

The invention claimed is:

1. A self-propelled cleaning robot that self-travels on and cleans a flat surface of a structure, a groove being formed in the flat surface, the self-propelled cleaning robot comprising:
 a robot main body in which a self-propelled moving means is provided, the self-propelled moving means being configured to drive the robot main body in any direction on the flat surface; and
 a guidance unit that guides movement of the robot main body,
 wherein the guidance unit includes:
 a shaft member that is provided so as to be movable between two positions, one of the positions being defined as an insertion position at which a tip of the shaft member is inserted in the groove and the other of the positions being defined as a retreat position at which the tip of the shaft member is out of the groove; and
 a shaft member moving mechanism that controls the position of the shaft member between the insertion position and the retreat position with respect to the groove, and
 while the shaft member stays at the insertion position with the shaft member moving mechanism, the self-propelled moving means drives the robot main body in a direction such that the robot main body rotates around the shaft member, which is seen from a top view of the flat surface.

2. The self-propelled cleaning robot according to claim 1, wherein a plurality of grooves parallel to each other are formed in the flat surface,
a pair of guidance units is provided so as to sandwich the robot main body therebetween, and
the pair of guidance unit is provided such that a distance between the shaft members in the pair of guidance units is equal to a distance between the adjacent grooves formed in the flat surface.

3. The self-propelled cleaning robot according to claim 1, wherein the movement of the robot main body is controlled such that the robot main body moves along the groove, and the guidance unit includes:
a pair of guide members that is provided so as to sandwich the shaft member therebetween in a moving direction of the robot main body; and
a guide member moving mechanism that detachably inserts a leading end portion of the pair of guide members in the groove.

4. The self-propelled cleaning robot according to claim 3, wherein the shaft member moving mechanism includes a shaft member moving unit that causes the shaft member to be inserted and removed with respect to the groove, and
the guide member moving mechanism swings the guide member along the moving direction of the robot main body.

5. The self-propelled cleaning robot according to claim 3, wherein the guide member includes a meandering detector that detects meandering of the robot main body.

6. The self-propelled cleaning robot according to claim 5, wherein the meandering detector includes a link mechanism that can swing along a width direction of the groove.

7. The self-propelled cleaning robot according to claim 1, wherein
a plurality of other grooves are formed in the flat surface, all of which extend straight and arranged in parallel, such that two of the grooves adjacent each other are distant at a predetermined interval, which is a groove interval,
the robot main body further includes another guidance unit that is identical to the guide unit such that the pair of the guidance units are distant at the same interval as the groove interval, and that the self-propelled moving means is positioned between the pair of the guidance units,
when the robot main body runs along the grooves, both of the shaft member moving mechanisms cause both of the shaft members to stay at the insertion position, and
when the robot main body initiates to rotate, one of the shaft member moving mechanisms causes one of the shaft members, which corresponds to the one of the shaft member moving mechanisms and is defined as a pivotal shaft member, stays in the insertion position, and the other of the shaft member moving mechanisms causes the other of the shaft members, which is not the pivotal shaft member, to move to the retreat position so that the robot main body rotates around the pivotal shaft member.

8. The self-propelled cleaning robot according to claim 7, wherein
when the robot main body completes to rotate around the pivotal shaft member, the other of the shaft members, which was not the pivotal shaft member, is positioned on another groove that is adjacent to the pair of the grooves, and the other of the shaft member moving mechanisms causes the other of the shaft members to move to the insertion position so that the robot main body runs along the grooves.

9. The self-propelled cleaning robot according to claim 8, wherein
when the robot main body initiates to rotate after rotating around the pivotal shaft member, the one of the shaft members, which was used as the pivotal shaft member at the most recent rotation, is moved to the retreat position such that the other of the shaft members stays at the insertion position, the robot main body rotating around the other of the shaft members.

* * * * *